Figure 1:
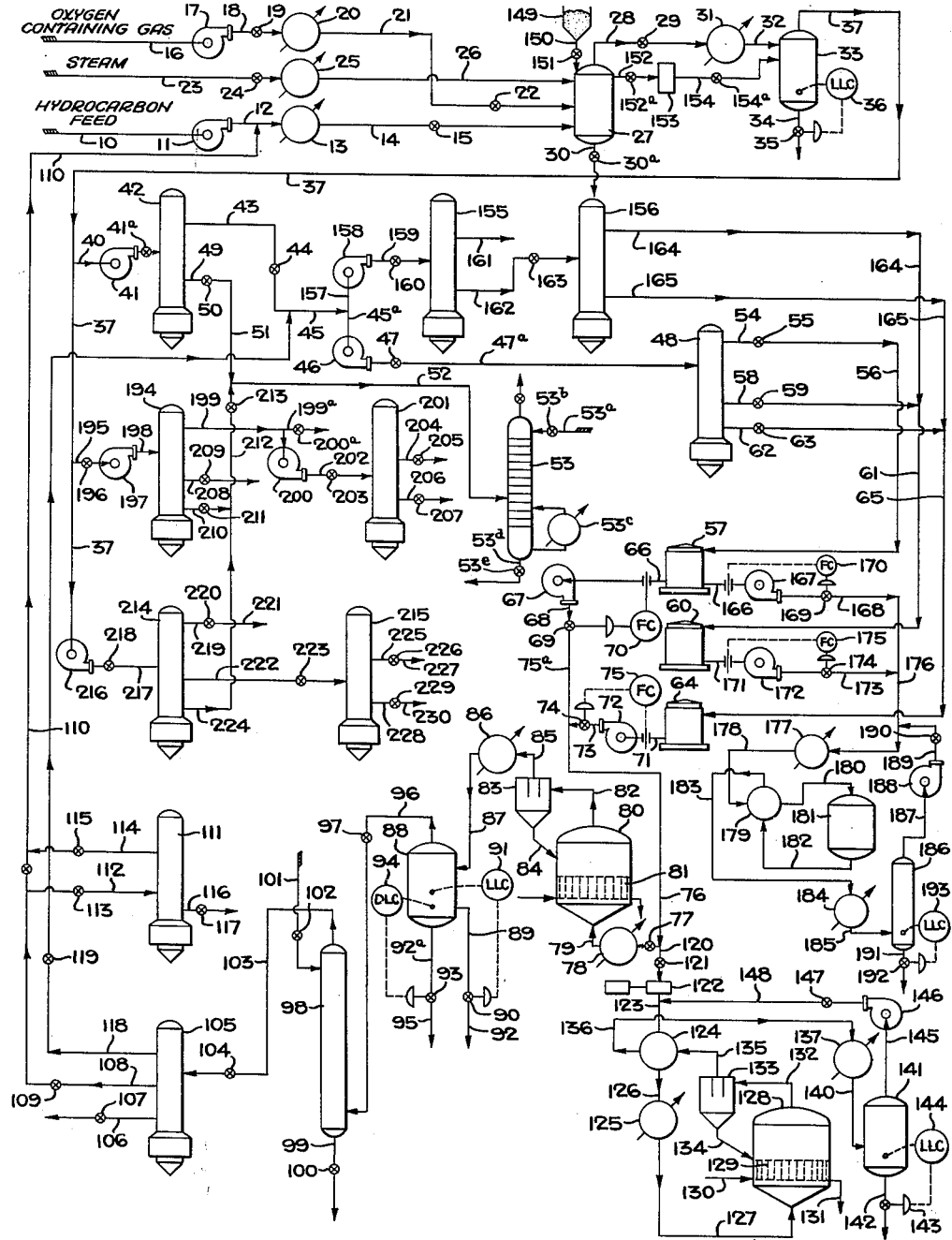

INVENTORS
CLYDE H. O. BERG
HOMER C. REED
FRED L. HARTLEY
BY Ross J. Garofalo
ATTORNEY

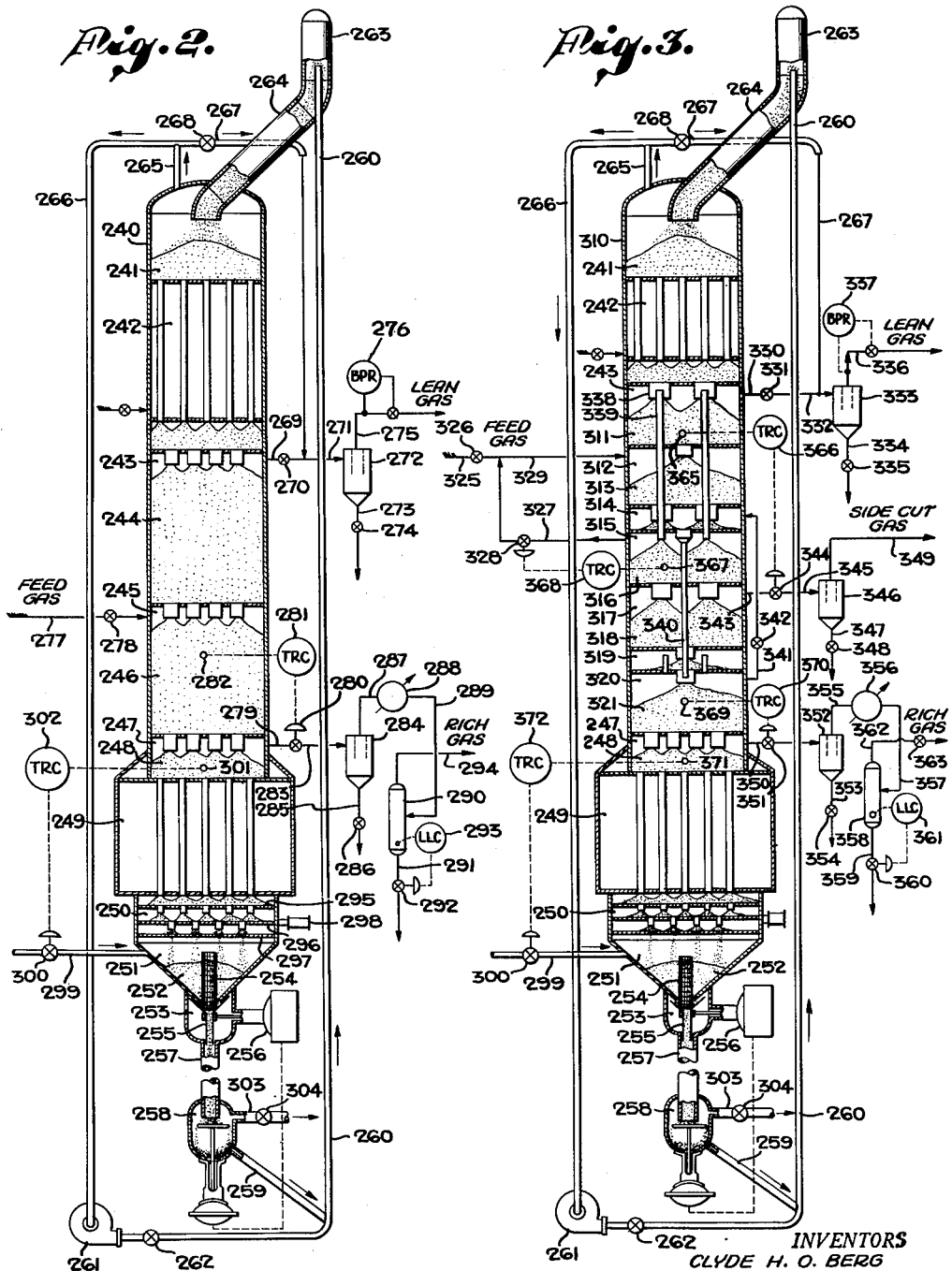

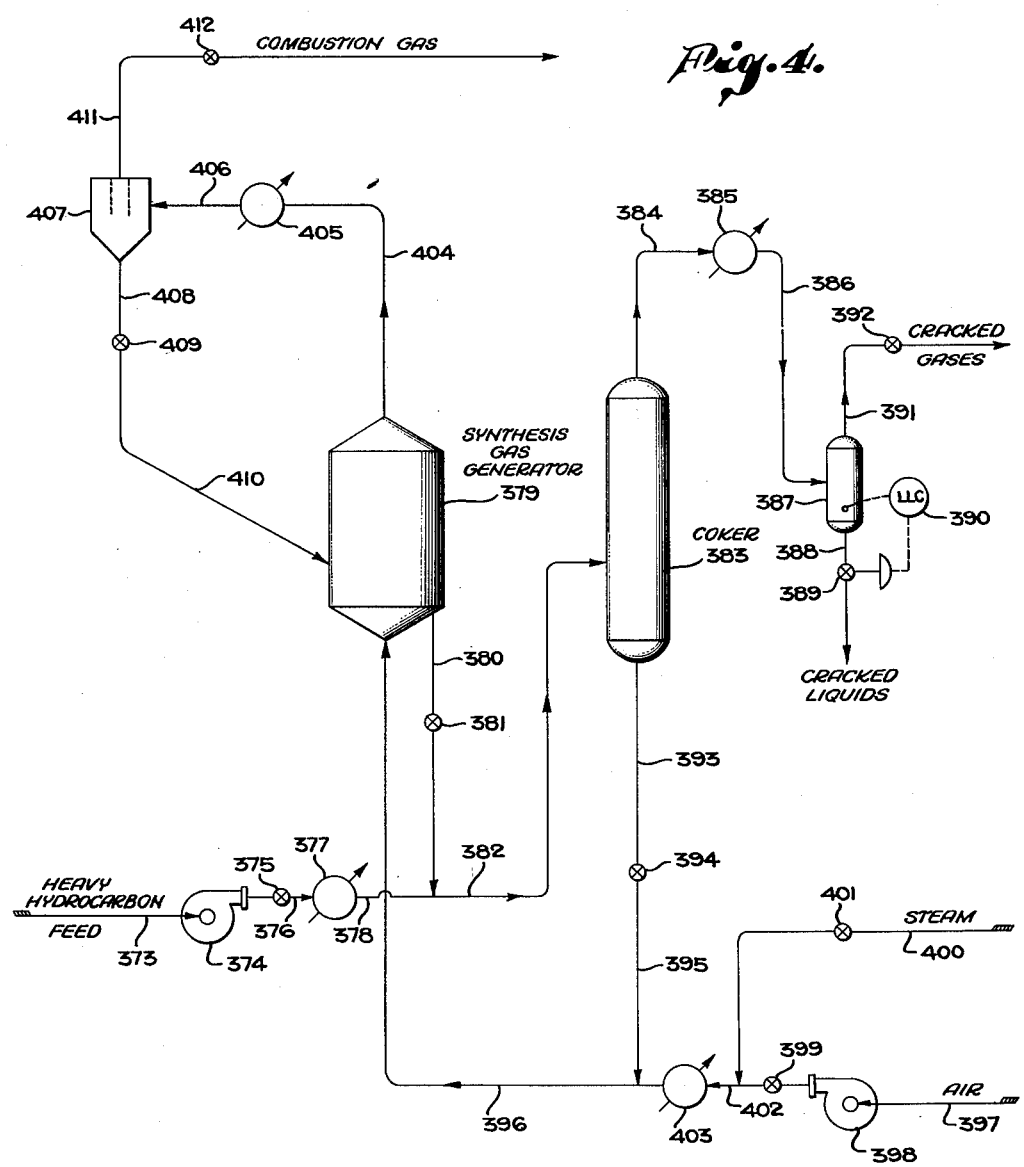

Patented Mar. 24, 1953

2,632,528

UNITED STATES PATENT OFFICE 2,632,528

IRON-GROUP IMPREGNATED ADSORBENT IN ADSORPTION PROCESS

Clyde H. O. Berg, Long Beach, Homer C. Reed, Glendale, and Fred L. Hartley, Los Angeles, Calif., assignors to Union Oil Company of California, Los Angeles, Calif., a corporation of California Application September 27, 1947, Serial No. 776,564

20 Claims. (Cl. 183—114.2)

This invention relates to a process and apparatus for the continuous separation of gaseous mixtures by the selective adsorption of certain constituents present in such gaseous mixtures on a solid granular adsorbent. The invention more specifically relates to a process and an apparatus for the continuous separation of gaseous mixtures, comprising predominantly the inorganic gases: hydrogen, nitrogen and carbon monoxide, by selective adsorption on granular charcoal into a plurality of fractions each comprising one or more constitutents of the gaseous mixture in substantially pure form. The invention further relates to a combination process for the production, fractionation or separation, and catalytic conversion of such gaseous mixtures to form valuable synthetic products.

Many compounds which are normally gaseous at atmospheric temperatures and pressures such as inorganic gases and the lower molecular weight hydrocarbon gases have been heretofore separated by distillation under elevated pressures and reduced temperatures. With regard to the lower molecular weight hydrocarbon gases, the separation by distillation of a gaseous mixture to produce an overhead product consisting of substantially pure ethylene requires that the operation be performed under a pressure as high as about 385 pounds per square inch and with a reflux temperature of —5° F. In the preparation of substantially pure methane, the distillation operation is conducted at pressures between 500 and 600 pounds per square inch and employs a reflux of liquid methane at a temperature of about —150° F. Inorganic gases such as hydrogen, helium, nitrogen, carbon monoxide, carbon dioxide and various gaseous oxides of nitrogen, sulfur and other inorganic elements may also be separated by fractional distillation under high pressure, and low temperature conditions. Perhaps the commonest of these is the separation of air by low temperature distillation. The refrigeration requirements are enormous and distillation temperatures of the order of —300° F. are required together with heat exchange equipment which is extremely complex. The production of susbtantially pure hydrogen and helium by distillation requires temperatures below about —400° F. and for economic reasons such separations are not extensively carried out. The same difficulties are involved in the separation of carbon monoxide from gaseous mixtures by distillation and as a result chemical methods are generally employed.

Substantially pure organic and inorganic gases are required in a multitude of chemical and industrial operations. Gases such as acetylene, ethylene and methane serve as the raw materials for the production of a host of synthetic chemicals. High purity hydrogen is used in the production of solid fats from vegetable oils, metallurgical operations in the production of synthetic ammonia by the catalytic hydrogenation of nitrogen, in the production of synthetic methanol and higher alcohols as well as the production of synthetic hydrocarbons and motor fuels by the catalytic hydrogenation of carbon monoxide, etc. In several of the operations previously mentioned substantially pure nitrogen and carbon monoxide are also highly desirable to avoid poisoning the catalysts employed.

It is to the improvement in the method of separation of normally gaseous mixtures that the present invention is particularly directed for it has been found that by application of the process of selective adsorption, as hereinafter more fully described, a more efficient, economical, and less complex method of operation results and the components of the mixture may be separated in relatively pure form substantially uncontaminated by foreign constituents.

A primary object of the present invention is to provide an improved selective adsorption process for the separation of gaseous mixtures containing constituents which are difficultly liquefiable and consequently difficultly separable by the conventional methods of distillation, absorption, or extraction.

It is a further object to provide a selective adsorption process which is particularly well adapted to the separation of substantially pure hydrogen, nitrogen and carbon monoxide from gaseous mixtures containing these gases.

It is an additional object of this invention to produce substantially pure hydrogen and carbon monoxide in a desirable ratio adaptable to conversion into synthetic hydrocarbons and synthetic oxygenated compounds such as alcohols.

It is another object of this invention to produce gaseous mixtures of hydrogen and nitrogen in a desirable ratio, such gaseous mixtures being of such purity that they are directly adaptable to the production of synthetic ammonia.

It is also an object of the invention to provide a method for separation of gaseous mixtures containing hydrogen and nitrogen, hydrogen and carbon monoxide or nitrogen and carbon monoxide into the various gases in substantially pure form, which method involves continuous selective adsorption.

It is still another object of this invention to produce synthetic compounds from carbonaceous gases, liquids or solids by a process which comprises controlled partial oxidation of the carbonaceous material with an oxygen-containing gas or oxygen to produce gaseous mixtures containing hydrogen, nitrogen and carbon monoxide, separation of the gaseous mixtures into their several components by continuous selective adsorption, selectively recombining the separated gases in proportions desirable for conversion, and converting the recombined gaseous mixtures into synthetic compounds.

It is a particular object to provide a method for the separation of substantially pure hydrogen and substantially pure carbon monoxide from gaseous mixtures produced by high temperature partial oxidation of carbonaceous materials using air or oxygen-enriched air as the oxidizing medium, which gaseous mixtures contain nitrogen.

It is a further object to provide a process for the production of synthetic compounds from gaseous mixtures which process possesses inherent advantages from efficiency and economical standpoints.

Other objects and advantages of the present invention will become apparent to those skilled in the art as the description thereof proceeds.

Briefly, the present invention comprises the partial oxidation of a carbonaceous material such as a hydrocarbon gas or vapor or carbonaceous solids at an elevated temperature with a gas containing oxygen to produce a combustion gas comprising hydrogen, nitrogen and carbon monoxide with or substantially without the production of unsaturated hydrocarbon gases such as acetylene, and subsequently separating such gaseous mixtures, regardless of their source or mode of preparation, into substantially pure fractions of hydrogen, nitrogen and carbon monoxide by the process of selective adsorption on a solid granular adsorbent. The individual constituents, hydrogen, nitrogen and carbon monoxide are subsequently combined in the proper ratio to form mixtures of hydrogen and nitrogen or mixtures of hydrogen and carbon monoxide which are subjected to conditions favorable to the catalytic hydrogenation of carbon monoxide to produce normally liquid hydrocarbons or alcohols, or to conditions favorable to the catalytic conversion of nitrogen to produce ammonia. The process of selective adsorption is further utilized to facilitate the separation of the gaseous products obtained from either catalytic hydrogenation step previously referred to in order to improve the efficiency of the process by separating the desired reaction product from the unreacted feed gases. The unreacted gases thus separated are returned to the catalytic process for retreatment. Recovered hydrocarbon gases formed as by-products in the hydrogenation of carbon monoxide may be separated in substantially pure form for use as chemical intermediates or as fuels, or may be returned to the partial combustion step for the formation of further quantities of hydrogen and carbon monoxide. An unusually efficient process is provided for the production, separation and utilization of such gaseous mixtures, which process requires substantially reduced amounts of refrigeration than processes effecting similar separations by low temperature distillation. Moreover, by the use of this process the necessity of preparing substantially pure oxygen for use in the oxidation step is avoided because of the fact that nitrogen present in the combustion products is readily separated from the hydrogen and/or carbon monoxide.

The present invention may be more clearly understood by reference to the accompanying drawings in which:

Figure 1 is a schematic flow diagram of the complete combination process referred to previously in which the process of selective adsorption is employed in conjunction with a process for the production of gaseous mixtures comprising hydrogen, nitrogen and carbon monoxide as well as unsaturated hydrocarbons, and with processes for utilization of hydrogen, nitrogen and carbon monoxide in substantially pure form or as mixtures blended according to requirement, Figure 2 shows an elevation view of a vertical cross section of one type of selective adsorption apparatus employed in effecting the separation of gaseous mixtures produced in the process shown in Figure 1 wherein a given gaseous mixture is separated into two fractions: the first fraction comprising constituents which are less readily adsorbable and the second fraction comprising constituents which are more readily adsorbable by the adsorbent under the conditions of operation, Figure 3 which shows an elevation view of a vertical cross section of a second type of a selective adsorption apparatus which is particularly well adapted to the separation of a gaseous mixture into three substantially pure fractions, wherein each fraction comprises at least one constituent which is substantially uncontaminated by constituents desirably present in other fractions, and Figure 4 which shows a modified method for producing combustion gas containing hydrogen, nitrogen, and carbon monoxide which involves the combination of continuous coking of heavy hydrocarbons with a fluidized solid heat transfer medium and subsequent partial burning of the coke deposited on the heat transfer medium.

Referring now more particularly to Figure 1, the process there shown includes three main interrelated operations, i. e., partial oxidation of carbonaceous material to form combustion gases, separation of the combustion gases by continuous selective adsorption, and catalytic conversion of the separated combustion gases into useful chemical products.

Partial combustion

A hydrocarbon fuel such as, for example, natural gas comprising essentially methane, but containing smaller amounts of ethane and possibly higher hydrocarbons, is introduced by means of line 10 into blower 11 whereby the natural gas is forced through line 12 into preheater 13 and thence through line 14 controlled by valve 15 into combustion zone 21. Should the hydrocarbon fuel comprise a liquid, preheater 13 also acts as a vaporizer and superheater and in either case the hydrocarbon is heated to an elevated temperature between about 500° F. and 1500° F., a temperature of between about 800° F. to 1200° F. being suitable for natural gas. The partial combustion is accomplished by burning the preheated natural gas with an oxygen-containing gas. This gas is preferably air, or oxygen-enriched air, or may be relatively pure oxygen, and is introduced by means of line 16 into blower 17 from which it passes by means of line 18 controlled by valve 19 into preheater 20. The oxygen-containing gas is preferably heated to a temperature in the range of 1500° F. to 2700° F., although temperatures between about 500° F. and about 3000° F. may be employed depending upon specific instances. The heated gas is removed from preheater 20 through line 21, controlled by valve 22 and is introduced into combustion zone 27 wherein it is mixed with the natural gas and a partial oxidation of the natural gas is effected.

Since it is desired to cause only partial combustion of the hydrocarbon fuel, the ratio of oxygen-containing gas to hydrocarbon feed must be carefully regulated in order to obtain the optimum degree of oxidation and a combustion gas having the desired composition. In the case of natural gas it is desirable to mix the natural gas and the oxygen-containing gas in such proportions that the hydrocarbons present will be oxidized to carbon monoxide and hydrogen with a minimum formation of carbon dioxide. It is further desirable that the gaseous mixture should be formed from about 3 volumes of air and 1 volume of natural gas. For other carbonaceous fuels and other oxygen-containing gases the ratio will vary depending on the carbon content of the fuel and the oxygen content of the oxygen-containing gas. The combustion gas produced under such conditions will contain hydrogen and carbon monoxide in a molar ratio of about 1.5 to about 2.5, a value highly desirable if the product is to be used in the synthesis of hydrocarbons, alcohols, such as methanol, and other oxygenated compounds by catalytic conversion. The quantity of carbon dioxide present in the combustion gases is in general less than about 5%.

It is sometimes desirable, particularly when employing a feed having low hydrogen to carbon ratios, to introduce steam simultaneously with the heated gases into combustion zone 27. Provision is made for this and steam is introduced by means of line 23 controlled by valve 24 and is passed through superheater 25 from whence the superheated steam is passed by means of line 26 into combustion zone 27. The function of steam in the partial combustion of carbonaceous fuel is somewhat complex, the steam acting as a diluent and also reacting at the elevated temperatures to raise the hydrogen-carbon monoxide ratio of the combustion gas.

The partial oxidation of the carbonaceous fuel effected in combustion zone 27 is carried out at temperatures between about 2000° F. and 3000° F. and at pressures between about atmospheric pressure and about 800 pounds per square inch in the formation of a flue gas or combustion gas containing considerable quantities of hydrogen, nitrogen and carbon monoxide, the nitrogen being introduced as air. This combustion gas further contains smaller quantities of hydrogen sulfide, carbon dioxide, water, carbonyl sulfide, and unsaturated hydrocarbons, such as acetylene, ethylene, and the like, depending on the purity of the carbonaceous feed and the combustion conditions. If acetylene is one of the desired products, the combustion conditions such as feed-oxygen ratio, temperature, pressure, time, and the like, may be controlled as described more completely hereinbelow.

The partial combustion of the hydrocarbon feed may be carried out in various ways such as by burning with a flame and employing a multiplicity of small jets which are so arranged that the velocity of the gas passing therethrough is substantially higher than the flame propagation velocity. The combustion may be effected with a flame passing through a small diameter tube through which the velocity is higher than the flame propagation velocity and which abruptly widens into a larger diameter tube wherein the flame is maintained. If desirable, heat may be removed from the system by circulating a gas or liquid in contact with the outside surfaces of the tubes. Another means for effecting the partial combustion is in the presence of refractory materials such as metal oxides, carbides, or metals which are capable of withstanding temperatures as high as from 2500° F. to 3000° F. without fusion or excessive volatilization. The oxides of calcium, magnesium, aluminum and zirconium are suitable, carbides such as corundum, silicon carbide or Carborundum may be used, and coke and graphite are forms of carbon which are also suitable. Further, metallic tungsten may be used. The presence of these refractory materials provides a surface upon which partial combustion reaction may take place. The partial combustion may be effected in a burner in which these refractory materials are arranged to act as insulation and further to provide a surface upon which the combustion may occur, for example, a refractory brick surface. It is further possible to employ these refractory solids as finely divided particles having a mesh size of less than about 20 to about 100. The combustion zone 27 may be so arranged that the passage therethrough of the combustible gaseous mixture maintains the divided solids in a condition of hindered settling. This results in the formation of a dense phase which comprises a heavy suspension of these particles in the combustible gas. Such a condition exposes a tremendous surface area upon which the combustion reaction may take place. It has been found possible to effect a partial combustion of coal or other bituminous material in situ by passing air into the ground through a coal seam or other aperture, causing partial oxidation and obtaining a combustion gas containing hydrogen, nitrogen, carbon monoxide, and other constituents. Gases produced in this manner may be fractionated by the selective adsorption process of this invention, as well as any gaseous mixtures containing the three aforementioned constituents and which are produced by any method.

The combustion gas, formed by any of the suitable methods indicated herein is removed from combustion zone 27 or other source, not shown, through line 28 controlled by valve 29. Any suspended particles of fly ash, carbon, or other solids are removed from the bottom of combustion zone 27 by means of line 30 controlled by valve 30a. The combustion gases are passed through cooler 31. It is highly desirable that cooler 31 function as a heat interchanger rather than as a mere cooling device in view of the large quantities of heat available at high temperature levels. It is therefore of advantage to combine cooler 31 with preheaters 13, 20 and 25. The combustion gases are cooled to a temperature of less than about 500° F. if hydrogen and carbon monoxide are the desired products in cooler 31. The cooled gas is introduced by means of line 32 into vapor-liquid separator 33 wherein condensate, if present, is separated. The condensate is removed from the bottom of separator 33 through line 34 controlled by valve 35 which in turn is actuated by a liquid level controller 36. The cooled gas is removed from the upper portion of separator 33 by means of line 37.

As an example of the production of a combustion gas suitable for hydrocarbon or synthetic chemical preparation, 1000 standard cubic feet (1000 s. c. f.) of a dry natural gas comprising essentially methane are preheated to a temperature of 1000° F. and burned with 3100 s. c. f. of air preheated to 2500° F. The combustion is effected at a pressure of about 600 pounds per square inch and at a temperature of 2750° F. The gaseous mixture has a residence time in the combustion zone which is of sufficient duration to insure the attainment of near equilibrium conditions. The hot combustion gases are cooled by indirect heat exchange to preheat the air and natural gas. The cooled combustion gases have approximately the following composition on a water-free basis:

| Component | Volume per cent |
|---|---|
| $H_2$ | 26.1 |
| CO | 14.6 |
| $N_2$ | 57.2 |
| $CO_2$ | 1.2 |
| $CH_4$ | 0.9 |
| | 100.0 |

This gas had a hydrogen to carbon monoxide ratio of 1.8 and may be fractionated by the process of selective adsorption to provide a synthesis gas suitable for producing synthetic liquid compounds.

*Separation by selective adsorption*

The combustion gas, such as one indicated in the preceding example but which may be substantially any mixture containing hydrogen, nitrogen and carbon monoxide from any source and produced by any method, is introduced through line 40 into compressor 41 controlled by valve 41a at a temperature between about 50° F. and 150° F., preferably at about 100° F., into selective adsorption column 42 wherein the combustion gas is fractionated to separate the minor constituents previously described.

In selective adsorption column 42 the combustion gases are contacted with a moving bed of solid granular adsorbent whereby the contaminants or minor constituents are selectively adsorbed. This method of gas purification permits an easy separation between the hydrogen, nitrogen and carbon monoxide as a substantially pure fraction uncontaminated by such constituents as carbon dioxide, hydrogen sulfide, carbonyl sulfide, water, and low molecular weight normally gaseous hydrocarbons, if present.

Selective adsorption column 42 is shown in Figure 1 schematically and the operation of the type of column used for this separation is more completely described in connection with Figure 2 hereinbelow. Suffice it to say that within selective adsorption column 42 the combustion gas is countercurrently contacted at a pressure of between about 100 and 300 pounds per square inch with about 200 and 400 pounds of granular adsorbent per M s. c. f. (1000 standard cubic feet) of feed gas thereby adsorbing the more readily adsorbable minor constituents to form a rich adsorbent and leaving a lean gas comprising hydrogen, nitrogen and carbon monoxide substantially unadsorbed. The lean gas product is removed from selective adsorption column 42 through line 43 controlled by valve 44 and is introduced through lines 45 and 45a into compressor 46 controlled by valve 47. The compressed gas is introduced through line 47a at a temperature of between about 50° F. and 150° F., preferably at about 100° F. into selective adsorption column 48 wherein the lean gas product is separated into three fractions each containing one of the previously named constituents in substantially pure form.

The rich adsorbent in selective adsorption column 42 is treated to effect desorption of the more readily adsorbable constituents by subjecting the rich adsorbent to indirect heating to about 550° F. and may be aided by direct contact with a stripping gas thereby desorbing the more readily adsorbable constituents as a rich gas product. The rich gas product thus desorbed is removed from selective adsorption column 42 at a point below that at which the combustion gas was introduced as feed and is conveyed by means of line 49 controlled by valve 50, lines 51 and 52 to be introduced at a temperature of between about 50° F. and 150° F., and preferably at about 100° F. into acetylene adsorption column 53 wherein acetylene, if present, is recovered from the rich gas product. The operation of this column will be described later in connection with acetylene production.

The construction and operation of selective adsorption column 48 is more clearly shown in Figure 3 and will be more clearly described hereinafter. Briefly, the separation within selective adsorption column 48 is accomplished by contacting the gaseous mixture at a pressure of between about 500 and 1000 pounds per square inch with between about 400 and 600 pounds of a solid granular adsorbent per M s. c. f. of the gaseous mixture to be separated. These conditions of operation are such that a lean gas comprising hydrogen remains substantially unadsorbed while nitrogen and carbon monoxide are adsorbed to form a rich adsorbent. By contacting the rich adsorbent with a reflux gas comprising carbon monoxide, a preferential desorption of nitrogen occurs to form a side cut gas product and the remaining carbon monoxide is removed by indirect heating to a temperature of about 650° F. with the use of a stripping gas or to somewhat higher temperatures in the absence of a stripping gas. The lean gas comprising substantially pure hydrogen is removed from selective adsorption column 48 by means of line 54 controlled by valve 55 and is sent through line 56 to hydrogen storage vessel 57. The side cut gas product comprising nitrogen substantially free of carbon monoxide and hydrogen is removed by means of line 58 controlled by valve 59 and sent to nitrogen storage vessel 60 through line 61. The rich gas product comprising carbon monoxide is removed from selective adsorption column 48 by means of line 62 controlled by valve 63 and sent to carbon monoxide storage vessel 64 through line 65.

As previously indicated, the process and apparatus of the present invention is capable of producing substantially pure hydrogen, nitrogen and carbon monoxide from gaseous mixtures comprising those constituents, and for this reason the process of selective adsorption as herein described is particularly well suited to cofunction with the described partial combustion process and with catalytic hydrogenation processes for the production of synthetic organic liquids and gases as well as synthetic ammonia.

*Catalytic conversion*

The hydrogen and carbon monoxide produced as previously described in one modification of the selective adsorption process of the present invention, are fractions of unusually high purity and are thus suitable for catalytic conversion. Hydrogen is removed from hydrogen storage vessel 57 by means of line 66 and is passed through compressor 67 wherein the gas is compressed to a pressure of between about 200 and 1000 pounds per square inch depending upon the desired pressure of operation in catalytic hydrogenation. The compressed hydrogen is passed through line 68 controlled by valve 69 which in turn is actuated by flow controller 70 thus assuring the compression of a constant volume rate of hydrogen. Similarly, carbon monoxide is removed from storage vessel 64 by means of line 71 and is passed through compressor 72 wherein the gas is compressed to a pressure between about 200 and 1000 pounds per square inch. The compressed gas is passed through line 73 controlled by valve 72 which in turn is actuated by flow controller 75 and is introduced into line 76 where it is mixed with the proper quantity of hydrogen flowing through line 75a to form a hydrogen-carbon monoxide mixture having the desired composition.

The catalytic hydrogenation of carbon monoxide may be carried out for the production of synthetic organic alcohols, ketones and other oxygenated compounds together with synthetic liquid hydrocarbons including fractions which are suitable for internal combustion engine fuels by passing a gas comprising carbon monoxide and hydrogen over a mild hydrogenation catalyst at temperatures ranging between about 300° F. and 800° F. and at pressures ranging between about 200 and 1000 pounds per square inch. Desirable products may be obtained by employing a synthesis gas containing hydrogen and carbon monoxide in a molal ratio between about 1.0 and 3.0, however, this ratio is preferably maintained between about 1.6 and 2.4. The ratio of 2.0 is the theoretical hydrogen to carbon monoxide ratio for the synthesis of methanol or the synthesis of —CH$_2$— radicals, which form the basic structural unit for synthetic hydrocarbon gases and liquids.

In carrying out the hydrogenation of carbon monoxide, the compressed hydrogen-carbon monoxide mixture having a hydrogen-carbon monoxide ratio above indicated, is passed through line 76 controlled by valve 77 through heater 78 wherein the gaseous mixture is preheated to a temperature between about 300° F. and 800° F. prior to introduction into the synthesis gas converter 80 by means of line 79. Although extremes of temperature of between 300° F. and 800° F. are applicable in a catalytic hydrogenation of carbon monoxide, the production of synthetic organic compounds and light hydrocarbon liquids is carried out at temperatures between about 400° F. and 650° F. Under special operating conditions, however, such as those required for the production of a maximum amount of synthetic organic compounds such as methanol, temperatures between about 525° F. and 725° F. are preferable. Temperatures higher than the maximum previously given, such as in the range of 750° F. to 875° F. are desirable for the production of isoparaffin type hydrocarbons, and aromatic type hydrocarbons are obtained in the products from operations employing temperatures as high as about 925° F.

Catalysts which may be employed in the synthesis gas conversion operation are selected from the metals of group VIII of the periodic table or oxides of these metals. The preferred group of catalysts comprises iron, cobalt and nickel, and of these three, iron is preferred since a rugged inexpensive catalyst may be prepared from iron oxide. Catalysts prepared from cobalt oxide may be employed to obtain a product which contains both saturated and unsaturated hydrocarbons while those catalysts containing nickel oxide result in the formation of a product containing more saturated hydrocarbons. Iron catalysts form greater quantities of olefins and other unsaturated hydrocarbons which may be polymerized to form higher molecular weight hydrocarbon liquids by using a longer contact time. Mixed catalysts containing any two or three of the aforementioned elements have been found to give intermediate results.

The catalyst may be introduced in metallic form or as oxides, or either as oxides or metals supported on a carrier which may comprise an activating material. Such carriers comprise the difficultly reducible oxides such as alumina, thoria, magnesia, zirconia, etc. The catalysts may be prepared by precipitation on an inert carrier such as kieselguhr, or the like. Many of these catalysts because of their constitution must be employed in a stationary bed thus requiring a number of catalyst cases or beds to be employed on a semicontinuous basis. Such a semicontinuous operation forms desirable products, however, the preferred modification of the synthesis gas conversion process employs an active iron oxide catalyst which is divided into small particles so that the catalyst may be handled as a fluid, that is, may be suspended in the synthesis gas so as to effect intimate contact therewith.

Returning now to Figure 1, the heated synthesis gas comprising a mixture of hydrogen and carbon monoxide is introduced into synthesis reactor 80 by means of line 79 wherein it contacts a fluidized catalyst at a temperature between about 300° F. and 800° F. and at a pressure between about 200 and 1000 pounds per square inch. Because of the upflow of synthesis gas thus introduced the catalyst is maintained in at least partial suspension involving a limited settling of solid particles within the upwardly flowing gas. The synthesis gas reaction is highly exothermic and thus heat transfer means 81 is provided within reactor 80 to dissipate a portion of the heat generated. Any applicable heat transfer fluid may be employed such as, for example, water which is evaporated to generate steam under pressure, the evaporation of organic heat transfer media such as diphenyl, diphenyl oxide, or mixtures thereof, etc.

The hot effluent gases, comprising unreacted carbon monoxide and hydrogen, together with synthesized hydrocarbon vapors, and organic oxygenated compound vapors together with a small amount of catalyst fines, are removed from synthesis reactor 80 by means of line 82 and introduced into separator 83 where the catalyst particles are separated. The separated catalyst particles are returned to synthesis gas reactor 80 by means of line 84. The effluent gases, substantially free of entrained solids, are removed from separator 83 by means of line 85 and passed through effluent gas cooler 86 wherein a substantial reduction in temperature is effected. Effluent gas cooler 86 may conveniently comprise an interchanger whereby heat removed from the effluent gases may be employed to heat the synthesis gas in heater 78. Effluent gas cooler 86 further comprises means for lowering the temperature of the effluent gases sufficiently to effect condensation under the particular operation pressure of the liquid products formed. The mixture of liquids and cooled gases is transferred by means of line 87 from effluent gas cooler 86 to separator 88. The condensed liquid products collect in the lower portion of separator 88 as two immiscible layers, the upper layer comprising synthetic hydrocarbon liquids and the lower layer comprising an aqueous solution of synthetic oxygenated organic compounds. The liquid hydrocarbons are removed through line 89 controlled by valve 90 which in turn is actuated by liquid level controller 91. The hydrocarbons are sent to storage or further processing, not shown, by means of line 92.

The aqueous solution is removed from separator 88 by means of line 92a controlled by valve 93 in which turn is actuated by differential level controller 94 and the aqueous solution is sent to storage or further processing by means of line 95. In general, this aqueous solution is processed by distillation to effect recovery of the individual organic constituents.

The unreacted hydrogen and carbon monoxide together with synthetic hydrocarbon gases and vapors are removed from the upper portion of separator 88 by means of line 96 controlled by valve 97 and are introduced into the lower portion of absorber 98. Within the absorber the gases contact a countercurrent flow of an absorbent such as an absorption oil which, depending upon the temperature and pressure of operation, may be made to effect the recovery of any desired fraction of the hydrocarbon constituents present in the gas. It is generally most economical to employ a quantity of absorption oil and temperature and pressure conditions sufficient to recover the $C_5$ and heavier hydrocarbons. A fat absorption oil containing these hydrocarbons is removed from the lower portion of absorber 98 by means of line 99 controlled by valve 100 and is sent to a stripping column, not shown, wherein the recovery of the $C_5$ and heavier hydrocarbons is effected to produce a lean absorption oil. The lean oil is recirculated by means of line 101 controlled by valve 102 into the upper portion of absorber 98.

The unabsorbed gases, from which the heavier hydrocarbon constituents have been absorbed, are removed from the upper portion of absorber 98 by means of line 103 controlled by valve 104 and are introduced into selective adsorption column 105 at a temperature between about 50° F. and 150° F., preferably at about 100° F. The gas thus introduced comprises a mixture of hydrogen, carbon monoxide, $C_1$, $C_2$, $C_3$, and $C_4$ hydrocarbons and may be at any pressure between about 100 and 600 pounds per square inch. In the column the gas is contacted with a countercurrent flow of between about 200 and 600 pounds of a solid granular adsorbent per M s. c. f. of gas. Under the operating conditions, the adsorbent exhibits a preferential adsorption for the $C_1$, and higher molecular weight hydrocarbon constituents. In adsorbing these constituents a rich adsorbent is formed and a substantially unadsorbed lean gas comprising hydrogen and carbon monoxide remains. Selective adsorption column 105, shown schematically, is more clearly shown in Figure 3, hereinafter more fully described. The rich adsorbent formed, as previously indicated in selective adsorption column 105, is contacted in the lower portion thereof with a reflux gas containing $C_3$ and $C_4$ hydrocarbons thereby causing a preferential desorption of $C_1$ and $C_2$ hydrocarbons leaving a rectified adsorbent containing substantially pure $C_3$ and $C_4$ hydrocarbons. The rectified adsorbent is subsequently subjected to indirect heating and may be contacted with a stripping gas to desorb the $C_3$ and $C_4$ hydrocarbons from the adsorbent and form a lean adsorbent. The $C_3$ and $C_4$ hydrocarbons thus desorbed are removed as a rich gas product by means of line 106 controlled by valve 107 from selective adsorption column 105. The $C_3$ and $C_4$ hydrocarbons thus produced as a rich gas may be subsequently liquefied and stored under pressure for use as liquefied petroleum gas (L. P. G.), may be polymerized or alkylated to form high quality gasolines or may be returned to combustion zone 27 for the formation of further quantities of carbon monoxide and hydrogen. The side cut product comprising $C_1$ and $C_2$ hydrocarbons is removed from selective adsorption column 105 by means of line 108 controlled by valve 109 and may be returned by means of line 110 to be combined with the natural gas treated as previously described in combustion zone 27. Alternatively this side cut may be passed into selective adsorption column 111 through line 112 controlled by valve 113 wherein the methane is separated as a lean gas and returned by line 114, controlled by valve 115 into line 110 for burning. The $C_2$ hydrocarbons, primarily ethylene, are adsorbed in column 111 and desorbed as has been previously described to give a rich gas product which is removed through line 116 controlled by valve 117 to storage or further processing, not shown.

A lean gas product comprising a gaseous mixture of hydrogen and carbon monoxide is removed from selective adsorption column 105 by means of line 118 controlled by valve 119 and is returned to be combined with the lean gas product removed from selective adsorption column 42 by means of line 43.

One particular advantage of the above described process which is immediately evident is that a complete elimination of any bleed gas or waste gases is effected and that in the process described the accumulation of undesirable constituents within the system does not occur thereby promoting the inherent economy of the process.

As an example of the synthesis of liquid hydrocarbons by the catalytic conversion of hydrogen and carbon monoxide a mixture of hydrogen and carbon monoxide in the molar ratio of 2 to 1 is preheated and passed into converter 80 operating at a temperature of about 650° F. and a pressure of 230 pounds per square inch, using a finely divided iron catalyst. A better than 98% conversion of carbon monoxide is realized. The total liquid hydrocarbon yield of 0.190 gallons per 1000 s. c. f. of feed gas is obtained consisting of about 80% by volume of normally liquid hydrocarbons, i. e., $C_5$ and heavier and about 20% by volume of $C_3$ and $C_4$ hydrocarbons. A gasoline having a boiling range of about 110° F. to 400° F. prepared from the liquid product will have a gravity of about 64° A. P. I. and an octane number (CFR) of about 70.

The above description of Figure 1 has involved the preferred modification of the invention and other desirable modifications thereof, being shown in Figure 1, will subsequently be described.

Methanol synthesis

The synthesis of substantially pure methanol may be conducted using a synthesis gas having a ratio of hydrogen to carbon monoxide of about 2.0. In order to accomplish this synthesis, the synthesis gas is passed by means of line 120 controlled by valve 121 into compressor 122 wherein the gas is further compressed to pressures of between about 2,000 and 4,000 pounds per square inch. The compressed gas is passed by means of line 123 through heat interchanger 124 wherein the temperature is raised to about 525° F. The preheated gas is subsequently passed through heater 125 via the line 126 wherein the temperature is further increased to temperatures desired for conversion. The heated gaseous mixture of hydrogen and carbon monoxide is subsequently passed through line 127 and is introduced into converter 128 wherein the methanol synthesis is effected. In Figure 1 this converter is indicated as being the type required for effecting fluidized catalytic reactions. However, conventional types of catalyst cases may be employed in which the catalyst comprises a static bed of solids through which the synthesis gas is passed.

Catalysts required to effect an efficient selective conversion to methanol may be composed principally of copper oxide, zinc oxide, chromium oxide, manganese oxide and aluminum oxide. These catalysts are highly selective in that substantially none of the carbon monoxide is hydrogenated to form methane and an efficient process for methanol synthesis results. The methanol synthesis reaction is preferably carried out at temperatures between about 500° F. and 725° F. and even at the latter temperature and at pressures as high as 4,000 pounds per square inch, only a trace of methane is formed. By employing finely divided catalysts such as those having particles smaller than 100 mesh, the catalyst may be intimately contacted with the gas to be converted by causing the particles of catalysts to be suspended within the gas. In the lower portion of converter 128 the conversion of hydrogen and carbon monoxide to synthetic methanol is effected and in the upper portion substantially complete separation of suspended catalyst particles from the product gases is effected.

In order to dissipate heat liberated during the reaction, heat transfer means 129 are provided which may comprise a tube bundle so that water may be evaporated to form steam or other heat transfer fluids may be employed. It is generally most convenient to employ water in which case this liquid is introduced by means of line 130 and steam generated is removed by means of line 131.

The effluent gases are removed from converter 128 by means of line 132 and are introduced into separator 133 wherein the remaining portions of suspended catalyst particles are then returned by means of transfer line 134 to the converter. The effluent gases, freed of suspended solids, are removed from separator 133 at a temperature of between about 525° F. and 725° F. and passed through interchanger 124 thereby heating the hydrogen-carbon monoxide mixture to be converted and cooling the effluent gases. These partially cooled gases are passed by means of line 136 through cooler 137 wherein the gases are further cooled and synthetic methanol and higher molecular weight alcohols, if present, are condensed. The condensed mixture is introduced by means of line 140 into separator 141. The synthetic alcohol collects in the lower portion of separator 141 and is withdrawn therefrom via line 142 controlled by valve 143 which in turn is actuated by liquid level controller 144. The unreacted carbon monoxide and hydrogen are removed from the upper portion of separator 141 by means of line 145 and under pressure exerted by blower 146 controlled by valve 147. These gases are recycled via line 148 to be recombined with the inlet synthesis gas.

Further modifications of the synthetic methanol process described above may comprise the elimination of cooler 137 and separator 141 and substitution therefor with a selective adsorption column of the type shown in Figure 2 which effects the separation of synthetic methanol as a rich gas product from the unreacted hydrogen and carbon monoxide mixture as a lean gas product. Such a selective adsorption column will be more clearly described in connection with Figure 2.

*Ammonia synthesis*

The hydrogen and nitrogen products as previously described may be employed as raw materials for the synthesis of ammonia. Hydrogen is removed from storage vessel 57 by means of line 166 and is compressed in compressor 167 to extremely high pressures such as between about 2000 and about 15,000 pounds per square inch. This compressed gas passes through line 168 controlled by valve 169 at a measured rate determined by flow controller 170. Nitrogen is removed from storage vessel 60 by means of line 171 and introduced into compressor 172 wherein the nitrogen is compressed to substantially the same pressure as the hydrogen. The compressed nitrogen is passed through line 173 controlled by valve 174 at a flow rate determined by flow controller 175 and is mixed in line 176 to form a hydrogen-nitrogen mixture having a molar ratio of about 3.0.

Since the selective adsorption process as herein described, is capable of the production of hydrogen and nitrogen substantially free from carbon monoxide, extensive purification of the hydrogen-nitrogen mixture is unnecessary. This mixture is passed by means of line 176 through preheater 177 wherein the temperature of the mixture is raised and this preheated mixture is passed by means of line 178 through heat interchanger 179 wherein the gaseous mixture is heated to a temperature of between about 850° F. and 1150° F. At this temperature the heated mixture is passed by means of line 180 through catalyst case 181 in contact with an alkali metal-promoted iron catalyst wherein a partial conversion of the hydrogen-nitrogen mixture to ammonia is effected with the liberation of heat. The effluent gases comprising nitrogen, hydrogen and ammonia are passed by means of line 182 through heat interchanger 179 whereby a substantial recovery of heat is effected in preheating the hydrogen-nitrogen mixture. The cooled effluent gases are passed by means of line 183 through effluent gas cooler 184 wherein the synthesized ammonia is condensed and unreacted gases are cooled. The cooled mixture is introduced into vapor-liquid separator 186 by means of line 185 and the unreacted hydrogen and nitrogen is removed therefrom through line 187 by means of blower 188 through line 189 controlled by valve 190 to be recycled and combined with the fresh hydrogen-nitrogen gas mixture. A high grade synthetic ammonia may be thus produced from the hydrogen and nitrogen separated by the selective adsorption process and is removed from vapor liquid separator 186 through line 191 controlled by valve 192 which in turn is actuated by liquid level controller 193 so that the liquid ammonia may be withdrawn as it is produced.

A modification of the ammonia synthesis procedure described exists in the elimination of gas cooler 184 and vapor-liquid separator 186. A selective adsorption column of the type described in connection with Figure 2 may be substituted in which case a lean gas product comprising unreacted nitrogen and hydrogen is produced. The synthesized ammonia is adsorbed from the gas and is produced as a rich gas product.

Carbonaceous feed to combustion zone

Although the preferred hydrocarbon feed employed in the present invention comprises natural gas, hydrocarbon liquids may be vaporized and introduced as a vapor with or without the simultaneous introduction of natural gas. It has also been found possible to effect the partial oxidation of carbonaceous solids by suitably grinding or otherwise pulverizing such solids so that they may be handled as a semi-fluid in the form of a gaseous suspension. Carbonaceous solids which are applicable in this instance comprise materials such as powdered coal, powdered coke such as that produced in the coking of hydrocarbon fractions, crude oil, coal or other carbonaceous materials. Cellulose materials such as the lower grade coals, waste wood, bagasse and the like may also be applicable. In introducing these finely divided materials into combustion zone 27, it is preferable that the material be passed from storage bin 149 and introduced at a controlled rate through line 150 controlled by valve 151 and contacted within the combustion zone with steam and an oxygen-containing gas. Another carbonaceous solid, coke deposited on a powdered carrier obtained in a fluid cracking operation will be subsequently described hereinbelow.

Oxygen-containing gas

The oxygen-containing gas employed in the preferred modification of the present invention comprises air which may or may not be enriched by the addition of oxygen. Oxygen-containing gases having oxygen concentrations as low as about 15% by volume are applicable, however, oxygen concentrations as high as 95% to 100% oxygen may be employed. If nitrogen is to be one of the product gases, air or oxygen-enriched air must be employed.

Acetylene production

By variations in the conditions under which partial combustion is effected it is possible to produce appreciable quantities of acetylene together with the hydrogen, nitrogen and carbon monoxide. Although it is possible to produce acetylene from natural gas or solid carbonaceous materials larger yields will be obtained when employing normally liquid hydrocarbons. Thus, although it is possible to produce combustion gases containing about 5% by volume of acetylene from natural gas, when using liquid hydrocarbon feed it is possible to produce combustion gases containing as high as 10% of acetylene. When acetylene is the desired product the hydrocarbon feed to the combustion zone will be preheated to a temperature of between about 600° F. to 1000° F. The air will be preheated to about 2500° F. and the temperature of the combustion zone will be maintained at about 2750° F. at atmospheric or lower pressure. A residence time of the combustion gases at a temperature of about 2750° F. in the combustion zone of less than about one second is employed and residence times of less than about 0.05 second are preferred. The combustion gases leaving the combustion zone are immediately quenched such as by direct contact with a water spray to a temperature as low as 100° F. Thus, with valve 29 closed, the combustion gases are passed from combustion zone 27 through line 152 controlled by valve 152a into quenching zone 153. The quenched mixture is passed through line 154 controlled by valve 154a into vapor-liquid separator 33.

The acetylene-containing gas is passed to selective adsorption column 42 as previously described and the rich gas produced therefrom contains acetylene together with carbon dioxide, carbonyl sulfide, hydrogen sulfide, etc. This gas is passed through lines 49, 51 and 52 to acetylene absorption column 53. In this column the gas is countercurrently contacted with between about 10 and 20 barrels of dimethoxy tetraethylene glycol per M s. c. f. of acetylene present in the gaseous mixture at temperatures of about 100° F. and at atmospheric pressure. The solvent is introduced through line 53a controlled by valve 53b and flows downwardly through the column. The liquid at the bottom of the column is maintained at about 130° F. by means of heater 53c and a rectified fat solvent substantially free of constituents other than acetylene is removed from the bottom of the column by means of line 53d controlled by valve 53e.

The fat solvent is sent to a stripper, not shown, for the recovery of acetylene and the lean solvent is returned to the absorption column.

Selective adsorption modifications

Selective adsorption column 48 which produces three substantially pure fractions of hydrogen, nitrogen and carbon monoxide, respectively, as described hereinabove, may be replaced in another modification of this invention by selective adsorption columns 155 and 156. In this modification valve 47 is closed and the lean gas product comprising a mixture of hydrogen, nitrogen and carbon monoxide removed from selective adsorption column 42 is passed by means of line 157 through compressor 158 wherein the pressure is increased to the desired operating range indicated below. The compressed gas is introduced by means of line 159 controlled by valve 160 at a temperature between about 50° F. and 150° F. preferably at about 100° F., into selective adsorption column 155 which is similar in construction and operation to that subsequently more fully described in connection with Figure 2. The compressed feed gas is contacted within selective adsorption column 155 with between about 500 and 800 pounds of solid granular adsorbent per M s. c. f. of feed gas. The pressure of operation is preferably between about 500 and 1000 pounds per square inch. Under these conditions of operation the nitrogen and carbon monoxide are adsorbed to form a rich adsorbent leaving hydrogen substantially unadsorbed as a lean gas product. This lean gas product is removed from selective adsorption column 155 by means of line 161 and is sent to hydrogen storage vessel 57 by line 161 which is incompletely shown. The rich adsorbent containing nitrogen and carbon monoxide is heated to between about 400° F. and 650° F. and may be contacted with stripping gas to desorb a rich gas product comprising substantially pure nitrogen and carbon monoxide uncontaminated by hydrogen. The rich gas product is removed from selective adsorption column 155 and introduced into selective adsorption column 156 by means of line 162 controlled by valve 163. The temperature of the feed gas is desirably between about 50° F. and 150° F., preferably about 100° F. The nitrogen-carbon monoxide mixture is contacted therein with between about 400 and 1000 pounds of a solid granular adsorbent per M s. c. f. of feed gas. Selective adsorption column 156 is also similar to that hereinafter more fully described in connection with Figure 2. Selective adsorption column 156 may be operated at a pressure between about 400 and 600 pounds per square inch or at a somewhat higher pressure substantially equal to that employed in the operation of selective adsorption column 155. Under these operation conditions a substantially unadsorbed lean gas product comprising nitrogen uncontaminated by carbon monoxide is produced from selective adsorption column 156 and is sent to nitrogen storage vessel 60 by means of line 164 and 61. A rich gas product comprising substantially pure carbon monoxide is desorbed from the adsorbent at a temperature between about 400° F. and 650° F. in selective adsorption column 156 and removed therefrom and sent to carbon monoxide storage vessel 64 by means of lines 165 and 65.

In another modification of this invention selective adsorption column 42 may be replaced by selective adsorption column 194 which operates at between 400 and 800 pounds per square inch pressure and employs an adsorbent-feed gas ratio of between about 400 and 700 pounds per M s. c. f. Selective adsorption column 194 is similar in construction to that subsequently described in connection with Figure 3. In this modification the combustion gas is introduced by means of lines 37 and 195 controlled by valve 196 into compressor 197 wherein the gas is compressed to a pressure within the aforementioned range. The compressed gas is introduced at a temperature between about 50° F. and 150° F., preferably 100° F., into selective adsorption column 194 by means of line 198 wherein a substantially unadsorbed lean gas product is produced which comprises a mixture of hydrogen and nitrogen and is substantially free of carbon monoxide or any of the more readily adsorbable constituents. This lean gas product is removed from selective adsorption column 194 by means of line 199 and may be sent directly, by means of line 199a, controlled by valve 200a, to the ammonia synthesis unit. This gas may be of the desired composition but if additional hydrogen or nitrogen is required the additional gas may be supplied from hydrogen storage vessel 57 or nitrogen storage vessel 60. If separation of the hydrogen-nitrogen lean gas product is desired the gas is further compressed, if required, to a pressure between 500 and 1000 pounds per square inch by means of compressor 200. The compressed gas is introduced into selective adsorption column 201 via line 202 controlled by valve 203. An adsorbent-feed gas ratio of from 400 to 800 pounds per M s. c. f. is employed to separate two fractions of hydrogen and nitrogen, respectively, in substantially pure form. A lean gas product of hydrogen is removed from selective adsorption column 201 and is sent to hydrogen storage vessel 57 by means of line 204 controlled by valve 205. A rich gas, nitrogen, is removed from selective adsorption column 201 by means of line 206 controlled by valve 207 and is sent to nitrogen storage vessel 60. Selective adsorption column 201 is of the type described more clearly in connection with Figure 2.

A side cut gas product comprising substantially pure carbon monoxide is removed from selective adsorption column 194 by means of line 208, incompletely shown, controlled by valve 209 and is sent to carbon monoxide storage vessel 64. The carbon monoxide thus produced is desorbed from the rich adsorbent in selective adsorption column 194 by contacting the adsorbent with a reflux gas comprising the more readily adsorbable constituents such as carbon dioxide, acetylene, hydrogen sulfide, etc., thus forming a rectified adsorbent free of carbon monoxide. The rectified adsorbent is heated to between 400° F. and 650° F. and may be contacted with stripping gas to desorb a rich gas product comprising the aforementioned constituents substantially free of carbon monoxide. The rich gas is removed from selective adsorption column 194 by means of line 210 controlled by valve 211 and is introduced to acetylene adsorption column 53 by means of lines 212 and 52 controlled by valve 213. Within acetylene adsorption column 53 as previously described, recovery of acetylene is effected.

Another modification of the separation procedure applied to the combustion gas produced in combustion zone 27 involves the use of selective adsorption columns 214 and 215, selective adsorption column 214 being of the type desribed in connection with Figure 3 and selective adsorption column 215 being the type described in connection with Figure 2. The combustion gas is passed by means of line 37 into compressor 216 where it is compressed to about 600 to 1000 pounds per square inch. The compressed gaseous mixture, at a temperature of between about 50° F. and 150° F., and preferably about 100° F., is introduced by means of line 217 controlled by valve 218 into selective adsorption column 214 wherein fractionation of the gaseous mixture is accomplished by contact with between about 700 and 1000 pounds of the adsorbent per M s. c. f. of gaseous mixture. A lean gas product comprising substantially unadsorbed hydrogen is removed by means of line 219 controlled by valve 220 and is sent to hydrogen storage vessel 57 by means of line 221. A side cut gas product comprising a mixture of substantially pure nitrogen and carbon monoxide is removed from selective adsorption column 214 and is introduced by means of line 222 controlled by valve 223 into selective adsorption column 215 at a temperature between about 50° F. and 150° F., preferably at about 100° F. A rich gas product is desorbed from the adsorbent in selective adsorption column 214 which comprises a mixture of the aforementioned more readily adsorbable constituents. This rich gas product is conveyed by means of lines 224 and 212 controlled by valve 213 and through line 52 into acetylene absorption column 53. The side cut gas product from selective adsorption column 214 is contacted at a pressure of between about 400 and 1000 pounds per square inch with between about 300 and 900 pounds of a solid granular adsorbent per M s. c. f. in selective adsorption column 215. A substantially pure nitrogen lean gas product is removed therefrom by means of line 225 controlled by valve 226 and is sent to nitrogen storage vessel 60 by means of line 227. A rich gas product comprising substantially pure carbon monoxide is desorbed by heating the adsorbent in selective adsorption column 215 to temperatures between 400° F. to 650° F. and is removed therefrom by means of line 228 controlled by valve 229 and is sent to carbon monoxide storage vessel 64 by means of line 230.

Solid granular adsorbents

For use in selective adsorption processes as herein described, granular adsorbents ranging from about 10 to 20 mesh in size are preferred. However, it has been found that other ranges of particle size are applicable. In some specific applications, granules as large as about 2 mesh may be employed and in certain other specific instances powdered adsorbents may be used having granules as fine as about 100 mesh or finer.

Of the various adsorbents which are applicable for use in the selective adsorption processes it is preferable to employ activated granular charcoal and particularly an activated vegetable charcoal made from fruit pits or nut shells such as coconut shell with granules of from 10 to 14 mesh in size. Other adsorbents such as silica gel, activated aluminum oxide, activated bauxite, and other activated animal and mineral carbons, and various adsorbents prepared from iron and chromium oxides, may be substituted for the preferred adsorbent.

It has also been found highly desirable to use impregnated or otherwise specially treated carbons as the separating agent employed in the selective adsorption processes, particularly when adsorbing carbon monoxide from nitrogen or hydrogen, or both. With regard to the specific separations made in the combined process herein described, it has been found that by impregnation of activated vegetable charcoals with metals selected from the iron group of group VIII of the periodic table, adsorbents are formed which exhibit a higher degree of selectivity for the adsorption of carbon monoxide from gaseous mixtures containing this constituent. The preferred metals used in forming these special adsorbents comprise iron and nickel although cobalt may be suitable.

Nickel impregnated charcoals exhibit high degrees of carbon monoxide selectivity when the charcoal is contacted with a gaseous mixture containing carbon monoxide at temperatures of between about 85° F. and 175° F. Desorption temperatures in the range of from 250° F. to 500° F. and depending upon the pressure of operation, serve efficiently to desorb carbon monoxide present on the charcoal. The formation of metal carbonyls, such as for example, nickel-tetracarbonyl is believed to account for the enhanced selectivity of the charcoal. Nickel-tetracarbonyl is a liquid at atmospheric pressure with a boiling point of about 110° F. and thus the formation of the nickel impregnated charcoals may be effected by putting the selective adsorption column into operation and by introducing, over a period of time, the required amount of nickel-tetracarbonyl in the vapor state to form the impregnated charcoal within the selective adsorption column. By operating the desorption zone at a sufficiently high temperature, such as from 250° F. to about 500° F., to decompose the adsorbed nickel carbonyl with a liberation of carbon monoxide, a suitable impregnated charcoal results. Such charcoals containing from less than about 1% by weight to as high as about 20% by weight or higher of nickel have been found to give enhanced separations of carbon monoxide from gaseous mixtures containing such other constituents as hydrogen, nitrogen, carbon dioxide, hydrogen sulfide, and the like.

Highly selective adsorbent charcoals may be also prepared by introducing a vaporous stream of iron carbonyl such as iron pentacarbonyl, for example, in a similar manner. An iron impregnated activated charcoal adsorbent is desirable at higher pressures of operation wherein the adsorbent temperatures are also correspondingly higher. For example, an iron impregnated charcoal will adsorb increased quantities of carbon monoxide at temperatures between about 200° F. and 250° F. from gaseous mixtures containing this constituent. Desorption zone temperatures in excess of 350° F. serve adequately to desorb the carbon monoxide present on the rich charcoal.

The impregnated charcoals just described may be prepared from any suitable animal, vegetable, or mineral carbon, and are preferably prepared from nut hull or fruit pit vegetable charcoals, screened to a mesh size of between about 10 and 35, or other adsorbents such as activated aluminum oxide, silica gel and the like may be impregnated to form desirable selective adsorbents.

The carbonyl impregnated adsorbent such as activated charcoal may require reactivation to prevent undue loss of adsorptive capacity caused by the accumulation of the adsorbent of undesirable substances. A small portion, such as from less than 1% to as high as about 20% by weight or higher, of the impregnated adsorbent circulated through the selective adsorption column, may be withdrawn and subjected to a reactivation operation at elevated temperatures of between about 500° F. and 2000° F. in an atmosphere of hydrogen. The reactivated adsorbent, thus treated, may be returned to the selective adsorption column.

Construction and operation of selective adsorption columns

Referring now more particularly to Figure 2, an elevation view of a vertical cross section of a selective adsorption column is shown in considerable detail. This selective adsorption column represents the type of construction necessary for selective adsorption columns 42, 155, 156, 201 and 215 indicated in Figure 1. The actual physical dimensions, such as for example the height and the cross sectional area of the aforementioned columns, depend upon the operation pressure and the quantity of gaseous mixture to be separated. The cross sectional area of each column is, in each case, sufficient to allow a gas velocity of between about one-third and one-half that employed in distillation columns.

The apparatus as shown in and described in connection with Figure 2 is described and specifically claimed in a copending application, Serial No. 618,346, filed September 24, 1945, by one of the present inventors and now U. S. Patent No. 2,519,873, issued August 22, 1950.

Selective adsorption column 240 is provided, at successively lower levels, with hopper 241, adsorbent cooling zone 242, lean gas disengaging zone 243, adsorption zone 244, feed gas engaging zone 245, rectification zone 246, rich gas disengaging zone 247 and a desorption zone which includes both steaming zone 248 and adsorbent heating zone 249, adsorbent feeder zone 250 and bottom zone 251.

A continuous downward flow by gravity of a solid granular adsorbent is maintained in a solid bed through the aforementioned zones from hopper 241 to bottom zone 251. For purposes of illustration, this solid granular adsorbent will be considered to be the preferred adsorbent, granular charcoal. An accumulation of charcoal collects in bottom zone 251 forming charcoal level 252 which is maintained at a constant height or position by means of level control mechanism 253. Level control mechanism 253 comprises grid structure 254 supported by receptacle 255, and air or electrically-operated controller 256. Grid structure 254 and receptacle 255 are free to move along a vertical axis in accordance with the changes in height of charcoal level 252. The charcoal flows downwardly through and around grid structure 254, downwardly through receptacle 255, downwardly through sealing leg 257, and through charcoal flow control valve 258. As charcoal level 252 changes, controller 256 actuates charcoal flow control valve 258 thereby effecting an appropriate change in the charcoal flow rate which restores charcoal level 252 to the desired position. The charcoal continues to flow downwardly through charcoal flow control valve 258, through transfer line 259, and into adsorbent lift line 260. At the junction of lines 259 and 260 a suspension of charcoal in a portion of the lean gas product as a lift is formed and under the influence of lift gas blower 261 controlled by valve 262 the suspension is raised upwardly through lift line 260 and introduced into impactless separator 263. Herein the charcoal-lift gas suspension is broken and the lift gas and charcoal flow downwardly through transfer line 264 as more or less independent phases and are introduced into hopper 241. The lift gas, disengaged from the charcoal, is removed from the upper portion of selective adsorption column 240 by means of line 265 and is subsequently divided into two portions. The first portion is returned by means of line 266 to blower 261 in sufficient quantity to permit the required circulation of charcoal. The second portion is withdrawn by means of line 267 controlled by valve 268 and is subsequently joined with the lean gas product removed from lean gas disengaging zone 243 by means of line 269 controlled by valve 270. A slight pressure drop is maintained across valve 270 to permit the flow of the second portion of lift gas from the upper portion of the column to the point of outlet of the lean gas product. The combined streams are introduced by means of line 271 into separator 272 wherein suspended particles of charcoal are removed and withdrawn therefrom by means of line 273 controlled by valve 274. The lean gas product, substantially free of suspended charcoal, is removed from separator 272 by means of line 275 provided with back pressure regulator 276 and is sent to storage or further processing not shown.

The feed gas comprising the gaseous mixture to be separated is introduced by means of line 277 controlled by valve 278 into feed gas engaging zone 245. The gaseous mixture thus introduced passes upwardly through adsorption zone 244 wherein it contacts a countercurrent flow of solid granular charcoal. The more readily adsorbable constituents are adsorbed to form a rich charcoal and the less readily adsorbable constituents are left as a substantially unadsorbed lean gas. A small portion of the less readily adsorbable constituents are also adsorbed on the rich charcoal. The substantially unadsorbed gas passes upwardly toward lean gas disengaging zone 243 wherein it divides into two portions, a substantial portion being withdrawn by means of line 269 as a lean gas product previously described and the remaining portion passing upwardly through lean gas disengaging zone 243 and subsequently upwardly through the tubes of adsorbent cooling zone 242. This remaining portion of lean gas in passing upwardly through the cooling zone effects the desorption of small quantities of water vapor or other very readily adsorbable constituents, if present, and also saturates the charcoal with constituents present in the lean gas. This gas, including desorbed constituents, passes upwardly through hopper 241 and is removed by means of line 265 as previously described in connection with the lift gas.

The rich charcoal formed in adsorption zone 244 passes downwardly into rectification zone 246 wherein it contacts a reflux gas containing the more readily adsorbable constituents in substantial amount. Since charcoal exhibits a preferential adsorption for certain constituents, the effect of this gaseous reflux containing more readily adsorbable constituents is to cause the desorption therefrom of the small amount of less readily adsorbable constituents to form a rectified charcoal. The thus desorbed constituents pass upwardly through adsorption zone 244 and are removed with the lean gas product. The rectified charcoal, substantially free of less readily adsorbable constituents and containing only those constituents desired in the rich gas product, passes downwardly through the desorption zone. Here the rectified charcoal is subjected to indirect heating with or without direct contact of a stripping gas such as steam, for example, to cause a substantially complete desorption of more readily adsorbable constituents leaving a hot lean charcoal and forming a rich gas. The rich gas thus formed passes upwardly to rich gas disengaging zone 247 and a portion passes upwardly into rectification zone 246 to serve therein as reflux, while the remainder is removed from rich gas disengaging zone 247 by means of line 279 controlled by valve 280 which in turn is actuated by temperature recorder controller 281. A temperature effect is noted with the contact of rich adsorbent by the reflux gas in rectification zone 246 because adsorption is an exothermic phenomenon and a thermocouple point or other temperature sensitive means 282 is provided in conjunction with temperature recorder controller 281 to control the rate of removal of rich gas product from rich gas disengaging zone 247. Such a temperature control method permits the production of the maximum quantity of rich gas with a minimum amount of contamination.

The rich gas product thus withdrawn is introduced by means of line 283 into separator 284 wherein traces of suspended charcoal particles are removed. These charcoal particles are withdrawn from the separator 284 by means of line 285 controlled by valve 286. The adsorbent-free rich gas product is passed by means of line 287 into rich gas cooler 288 where the temperature of the rich gas product is lowered and the condensation of condensable constituents is effected if such condensable constituents are present. The cooled mixture is passed by means of line 289 into separator 290 wherein the separation of rich gas product from any condensate is carried out. The condensate collecting in the lower portion of separator 290 is removed therefrom through line 291 controlled by valve 292 which is actuated by liquid level controller 293. The cooled rich gas product, free of condensable materials, is removed from separator 290 and sent to further processing or storage, not shown, by means of line 294.

The lean charcoal, substantially free of adsorbed constituents, flows downwardly through the tubes of heating zone 249 and passes through charcoal feeder zone 250 which comprises stationary tray 295, movable tray 296 and perforated tray 297. A reciprocating motion is applied to movable tray 296 by driving means 298 so as to accurately control the rate of charcoal flow downwardly through the selective adsorption column. The tubes extending downwardly from movable tray 296 are open at the upper end and are filled with charcoal flowing downwardly through the tubes attached to stationary tray 295 while movable tray 296 is at one position. The tubes subsequently are emptied when the bottoms of the tubes attached to movable tray 296 are opened so that the charcoal discharges through apertures provided in perforated tray 297 at another position of movable tray 296. The flowing charcoal, thus metered, accumulates in bottom zone 251 and is recirculated to the upper portion of selective adsorption column 240 in the manner previously described. The hot lean charcoal flows downwardly through the tubes of adsorbent cooling zone 242 and is introduced at a temperature of about 90° F. to 110° F. into adsorption zone 244 when water is employed as coolant. Lower adsorbent temperatures may be obtained by refrigerating the coolant or using suitable refrigerants evaporating under pressure.

It is sometimes of assistance in causing the desorption of more readily adsorbable constituents from the charcoal to pass a stripping gas, such as for example steam, upwardly through the tubes of heating zone 249 in countercurrent contact with the rich charcoal passing downwardly therethrough. This stripping gas is most conveniently introduced into bottom zone 251 by means of line 299 controlled by valve 300. The presence of stripping gas, which in general is more readily adsorbable than those constituents present in the rich gas product, causes a temperature effect in steaming zone 248 which may be detected by means of thermocouple point 301 and temperature recorder controller 302 serves to actuate valve 300. Thus, a circulation of stripping gas may be maintained upwardly in the gaseous phase through the tubes of heating zone 249 to be adsorbed on the adsorbent in steaming zone 248 and subsequently to flow downwardly through the tubes of heating zone 249 as an adsorbed phase. In the lower portions of heating zone 249 the stripping gas is subsequently liberated by means of heat to repeat the stripping cycle. In this manner very little stripping gas is removed with the rich gas product. A small portion of the stripping gas thus introduced passes concurrently with the charcoal flowing downwardly through level control zone 253, sealing leg 257 into charcoal flow control valve 258. At the same time a small portion of the lift gas passes upwardly through transfer line 259 countercurrently to the downwardly flowing charcoal. In order to prevent contamination of the lift gas with a small portion of the stripping gas or the contamination of the rich gas product with a portion of the lift gas, a seal gas is removed from charcoal flow control valve 258 by means of line 303 controlled by valve 304. By observing the precautions and conforming to the methods of operation described, the selective adsorption apparatus herein depicted is capable of making the separation of gaseous mixtures to produce lean gas and rich gas products of extremely high purity.

The selective adsorption apparatus just described in conjunction with Figure 2 is applicable to the separation of a lean gas consisting of hydrogen, nitrogen and carbon monoxide from more readily adsorbable gases, to the separation of hydrogen from nitrogen and carbon monoxide and to the separation of nitrogen from carbon monoxide. This apparatus is further applicable to the separation of hydrogen from nitrogen.

As indicated in connection with the description of the process of the present invention as shown in Figure 1, a modification of selective adsorption apparatus capable of producing three substantially pure fractions from a feed gas mixture in a single column is shown in Figure 3. This modification of selective adsorption apparatus is capable of producing substantially pure streams of hydrogen, nitrogen and carbon monoxide; streams of hydrogen-nitrogen, carbon monoxide, and more readily adsorbable constituents; or streams of hydrogen, nitrogen-carbon monoxide, and more readily adsorbable constituents from appropriate feed mixtures. The modification shown in Figure 3 is further capable of producing a first fraction comprising hydrogen, nitrogen and carbon monoxide, a second fraction comprising $C_1$ and $C_2$ hydrocarbons, and a third fraction comprising $C_3$ and higher molecular weight hydrocarbons. Furthermore, because of the mechanical construction of internal portions of selective adsorption apparatus described in conjunction with Figure 3, it is possible to produce three such fractions which are substantially completely uncontaminated by constituents desirably present in the other fractions. The modification of selective adsorption column shown in Figure 3 shows details of construction required in selective adsorption columns 48, 105, 194, and 214 shown schematically in Figure 1.

The apparatus as shown in and described in connection with Figure 3 is described and specifically claimed in a copending application, Serial No. 751,320, filed May 29, 1947, by one of the present inventors and now U. S. Patent No. 2,519,874, issued August 22, 1950.

Referring now more particularly to Figure 3, portions of the apparatus shown therein which are also shown in Figure 2 serve identical functions and are indicated in Figure 3 with the same numbers. Selective adsorption column 310 is provided with hopper 241, adsorbent cooling zone 242, lean gas disengaging zone 243, steaming zone 248, adsorbent heating zone 249, adsorbent feeder zone 250, and bottom zone 251. A level control mechanism 253 comprising the same parts as the level control mechanism described in connection with Figure 2 is also provided which maintains an adsorbent level 252 as previously described. The adsorbent flows downwardly through the level control mechanism 253, through sealing leg 257, through adsorbent flow control valve 258, and transfer line 259 as previously described. An adsorbent-lift gas suspension is formed and the adsorbent is thereby returned to the upper portion of selective adsorption column 310 in an entirely analogous manner.

Selective adsorption column 310 is further provided with a feed gas adsorption zone 311, a feed gas engaging zone 312, a primary rectification zone 313, a secondary reflux gas engaging zone 314, a primary reflux gas disengaging zone 315, a first side cut gas rectification zone 316, a side cut gas disengaging zone 317, a second side cut gas rectification zone 318, adsorbent flow controller zone 319, secondary reflux gas disengaging zone 320, and secondary rectification zone 321. Feed gas adsorption zone 311 together with primary rectification zone 313 comprise the feed gas zone, first side cut gas rectification zone 316 and second side cut gas rectification zone 318 comprise the side cut gas zone, and secondary rectification zone 321 and steaming zone 248 comprise the rich gas zone. The feed gas zone, the side cut gas zone and the rich gas zone collectively comprise what is called the separation zone.

A continuous downward flow of lean solid granular adsorbent, which again for the sake of simplicity will be considered to be the preferred adsorbent, activated charcoal, is maintained from hopper 241 through the tubes of cooling zone 242 into lean gas disengaging zone 243. The cooled lean charcoal is divided within the feed gas zone into two fractions: the first fraction being introduced into the feed gas zone and the second into the side cut gas zone as hereinafter more fully described. The lean charcoal continues to flow in separate streams through the feed gas zone and through the side cut gas zone and the charcoal streams withdrawn from the feed and side cut gas zones are subsequently combined in adsorbent flow controller zone 319 and introduced together into secondary rectification zone 321. The charcoal subsequently flows through secondary rectification zone 321, through rich gas disengaging zone 247, and continues downwardly through the desorption zone including steaming zone 248 and heating zone 249. The charcoal subsequently flows downwardly through adsorbent feeder zone 250 and is introduced eventually into lift line 260 as previously described.

The gaseous mixture to be separated is introduced by means of line 325 controlled by valve 326 and may be combined with a primary reflux gas flowing through line 327 controlled by valve 328 to form a combined feed. The primary reflux gas contains constituents which are less readily adsorbable than those desired in the side cut gas product and may be returned to any point within the feed gas zone, and it is merely a mechanical and operational expedient to combine the primary reflux gas with the gaseous mixture to be separated. The combined feed is introduced by means of line 329 into feed gas engaging zone 312. The combined feed thus introduced flows upwardly through feed gas adsorption zone 311 and is contacted with a downwardly moving bed of granular charcoal. Herein the more readily adsorbable constituents including those desired in the side cut gas and rich gas products are adsorbed by the charcoal to form a rich charcoal and leaving a lean gas containing the less readily adsorbable constituents as a substantially unadsorbed gas. A portion of the lean gas passes upwardly through adsorbent cooling zone 242 countercurrent to the downwardly flowing charcoal thereby serving as a drying gas to remove traces of moisture and more readily adsorbable constituents present on the charcoal, if any. The remaining portion of the lean gas is removed from lean gas disengaging zone 243 by means of line 330 controlled by valve 331 as more fully described hereinafter. The lean gas which passes upwardly through cooling zone 242 is removed from the upper portion of selective adsorption column 310 by means of line 265. The gas thus removed is divided into two portions in an entirely analogous manner as described in connection with Figure 2, the first portion being returned to the lift gas blower via line 266 while the second portion is conveyed via line 267 controlled by valve 268 to be joined with the lean gas product removed from disengaging zone 243. A pressure drop is maintained across valve 331 to permit that portion of the lean gas product to flow through line 267 under its own pressure to be combined with the lean gas product in line 332. The amount of gas flowing through line 267 in general amounts to about 20 mol per cent of the total quantity of the lean gas product.

The combined lean gas product flowing through line 332 is introduced into separator 333 which serves to separate traces of charcoal fines therefrom. These separated fines are withdrawn from separator 333 by means of line 334 controlled by valve 335. The lean gas product is subsequently removed from separator 333 by means of line 336 controlled by back pressure regulator 337 and is sent to storage or further processing, not shown.

The lean charcoal flowing downwardly from the adsorbent cooling zone 242 is divided into two streams as previously described: the first flowing through the feed gas zone and the second flowing downwardly through and separated from the feed gas zone to be introduced into the side cut gas zone subsequently to flow downwardly therethrough. The division of the lean charcoal into these two streams is accomplished in lean gas disengaging zone 243 so that the first portion flows downwardly through the annular space between tubes 338 and tubes 339 and the second stream flows downwardly through tubes 339 to be introduced directly into first side cut gas rectification zone 316. The first stream of lean charcoal flows downwardly through feed gas adsorption zone 311 to form a rich charcoal which is introduced into primary rectification zone 313. It is subsequently removed as a partially rectified charcoal to pass downwardly through tubes 340 for subsequent introduction into charcoal flow controller zone 319 wherein it is combined with the second stream of charcoal previously mentioned. This second stream of lean charcoal, introduced directly into first side cut gas rectification zone 316, passes downwardly through second side cut gas rectification zone 318 and subsequently into charcoal flow controller zone 320. By this mechanism the first stream of charcoal is employed to produce a lean gas product which is substantially free from constituents desired in the side cut gas and rich gas products and the second stream is employed to produce a side cut gas product which is substantially free from constituents desired in either the lean gas or rich gas products.

Returning now to the feed gas zone, the rich charcoal formed in feed gas adsorption zone 311 passes downwardly into primary rectification zone 313 wherein it is contacted with a countercurrent stream of secondary reflux gas containing constituents of intermediate adsorbability. This serves to desorb the less readily adsorbable constituents from the rich charcoal and forms a partially rectified charcoal containing constituents desirable in the side cut gas and rich gas products and which is substantially free from constituents desirable in the lean gas product. The small proportion of desorbed, less readily adsorbable constituents, passes upwardly through feed gas engaging zone 312 and is eventually removed with the lean gas product. The partially rectified charcoal formed in primary rectification zone 313 flows downwardly through secondary reflux gas engaging zone 314, downwardly through tubes 340 which conduct the partially rectified charcoal through, and independent of the side cut gas zone, for introduction directly into charcoal flow controller zone 319.

The partially rectified charcoal introduced into secondary rectification zone 321 is contacted therein with a rich gas reflux, rich in constituents desirable in the rich gas product. This reflux gas serves to desorb, from the partially rectified charcoal present in secondary rectification zone 321, a secondary reflux gas comprising constituents which are desirable in the side cut gas together with a small portion of constituents desirable in the rich gas product. The thus desorbed secondary reflux gas flows upwardly into secondary reflux gas disengaging zone 320 from which a portion flows upwardly through charcoal flow controller zone 319 into second side cut gas rectification zone 318 to serve therein as reflux and a second portion is removed by means of line 341 controlled by valve 342 and is introduced into secondary reflux gas engaging zone 314. The effect of the secondary reflux gas introduced into secondary reflux gas engaging zone 314 has been previously described. The first portion of the secondary reflux gas introduced, as previously indicated, into second side cut gas rectification zone 318 passes upwardly therethrough countercurrent to the downwardly flowing charcoal and a preferential adsorption of more readily adsorbable constituents, desirable in the rich gas product, is effected to form further quantities of partially rectified charcoal. The gas which remains substantially unadsorbed in second side cut gas rectification zone 318 comprises those constituents which are desirable in the side cut gas product and are in substantially pure form. A portion of this gas passing into side cut gas disengaging zone 317 is removed therefrom by means of line 343 controlled by valve 344 and is introduced by means of line 345 into separator 346 wherein traces of suspended charcoal are removed. The suspended charcoal particles are withdrawn by means of line 347 controlled by valve 348 and the side cut gas product is withdrawn by means of line 349 in a form substantially uncontaminated by constituents desirable in the lean gas or rich gas products.

A second portion of the gas desorbed in second side cut gas rectification zone 318 passes upwardly through side cut gas disengaging zone 317 and is introduced into first side cut gas rectification zone 316 to serve therein as reflux. The second portion of lean charcoal, previously referred to, introduced directly into first side cut gas rectification zone 316 of the side cut gas zone is saturated with constituents desirable in the lean gas product since a portion of the lean gas product flows upwardly through the tubes of adsorbent cooling zone 242 in direct contact with the adsorbent. Within first side cut gas rectification zone 316, a preferential desorption of these less readily adsorbable constituents is effected by means of contact with a side cut gas reflux thereby preventing contamination of the side cut gas product with less readily adsorbable constituents desirable in the lean gas product. The thus desorbed constituents form a primary reflux gas also containing a small quantity of constituents of intermediate adsorbability. This primary reflux gas passes upwardly into primary reflux gas disengaging zone 315 from whence it is removed by means of line 327 and combined with the gaseous mixture to be separated as previously described.

In secondary rectification zone 321 constituents of intermediate adsorbability are desorbed, as previously described, with the formation of a rectified charcoal containing constituents desirable in the rich gas product and a secondary reflux gas previously described. The rectified charcoal passes downwardly into the desorption zone wherein the adsorbed constituents are desorbed to form a rich gas, a portion of which is produced through line 350 controlled by valve 351 and is introduced into separator 352. Traces of suspended charcoal particles are herein separated and the particles are withdrawn by means of line 353 controlled by valve 354. The rich gas product in substantially pure form is passed from separator 352 by means of line 355 into rich gas product cooler 356 wherein condensation of condensable constituents is effected. The cooled rich gas product together with any condensate formed is passed by means of line 357 into vapor-liquid separator 358. The condensate, if formed, collects in the lower portion of separator 358 and is withdrawn therefrom by means of line 359 controlled by valve 360 which in turn is actuated by liquid level controller 361. The condensate-free rich gas product is subsequently removed from separator 358 by means of line 362 controlled by valve 363 and is sent to further processing or storage facilities, not shown.

The successful operation of the selective adsorption apparatus described is facilitated by a temperature means of controlling the flow rates of reflux and product gases involved in the separation. For example, the rate of removal of the side cut gas product is regulated by flow control valve 344 which in turn is actuated by thermocouple point 365 positioned in contact with the charcoal in feed gas adsorption zone 311. Thermocouple point 365, which is positioned in adsorption zone 311 but may be positioned in primary rectification zone 313, if desired, actuates temperature recorder controller 366 which in turn controls the rate of the side cut gas product removal and consequently the volumetric rate of reflux gas introduced into first side cut gas rectification zone 316. Similarly, thermocouple point 367 in contact with charcoal passing downwardly through first side cut gas rectification zone 316 operates in conjunction with temperature recorder controller 368 regulates the rate of removal of primary reflux gas from primary reflux gas disengaging zone 315 by varying the adjustment of flow control valve 328. In an entirely analogous manner thermocouple point 369 operating in conjunction with temperature recorder controller 370 varies the adjustment of control valve 351 to permit close regulation of the production rate of the rich gas product removed from rich gas disengaging zone 247. Thermocouple point 371 and temperature recorder controller 372 serve to actuate flow control valve 386 controlling the introduction of stripping gas into bottom zone 251.

The modification of selective adsorption apparatus shown and described in connection with Figure 3 is of such a design that when applied to the separation of gaseous mixtures comprising hydrogen, nitrogen, and carbon monoxide, gas products are formed of extremely high purity and in many cases are of sufficient purity to permit direct application to catalytic conversion processes, as previously described. There appears to be an active cofunctioning of the selective adsorption process as herein described with catalytic conversion processes employing mixtures of hydrogen and nitrogen or mixtures of hydrogen and carbon monoxide which result in high degrees of catalytic conversion brought about by the high purity of the gaseous mixtures produced.

Temperatures required for efficient desorption of adsorbed constituents from rectified adsorbent in all of the described processes depend upon the operation pressure, the nature of the adsorbed constituents, and on whether or not a stripping gas is employed. In the presence of a stripping gas such as steam, the adsorbent must be heated to a temperature at least as great as is indicated by the following relationship:

$$T = 175 P^{0.191}$$

where T is the temperature in degrees Fahrenheit and P is the pressure of the desorption operation in pounds per square inch absolute. In the absence of a stripping gas, the adsorbent must be heated to a temperature at least as great as is indicated by:

$$T = 175 P^{0.191} - 300$$

and is preferably heated to a temperature in excess of that employed in the presence of a stripping gas.

The ability of the described apparatus to produce a multiplicity of high purity fractions from a complex gaseous mixture is dependent upon efficient means of temperature and pressure control, as well as control of rates of flow of adsorbent and gaseous mixtures and the selection of a highly active adsorbent such as activated charcoal, or a treated charcoal as described, as well as the construction of the separation zone.

A further modification of this invention resides in the use of heavy hydrocarbon fractions as feed. In this modification, the heavy hydrocarbon feed is first cracked in a continuous fluid type cracking operation, and the resultant coke, which is carried on a powdered heat transfer medium, is subjected to partial combustion with a mixture of steam and air to produce a combustion gas containing hydrogen, carbon monoxide, hydrogen and other constituents in minor percentages.

Referring now more particularly to Figure 4 a schematic process flow diagram of a fluid type coking operation is shown. A low gravity hydrocarbon oil such as a heavy crude petroleum oil or a topped crude oil having an A. P. I. gravity from less than 10° to about 20° A. P. I. is introduced by means of line 373 into feed pump 374 controlled by valve 375. This hydrocarbon feed is subsequently passed by means of line 376 into feed preheater 377 wherein the oil is heated to a temperature of between about 300° F. and 700° F. The preheated oil is passed by means of line 378 and mixed with a quantity of a finely divided solid material at a temperature of between 2000° F. and 3000° F. which hot solid material is removed from synthesis generator 379 by means of line 380 controlled by valve 381. The highly heated solid material and a preheated oil is mixed in line 382, resulting in the heating of the oil to temperatures well above those required for thermodecomposition. The hydrocarbon constituents together with the finely divided solid material is passed by means of line 382 into the coker 383 wherein the coking reaction is carried to completion at temperatures of between about 750° F. and 1050° F. Considerable quantities of cracked gases and vapors are evolved which are removed from the upper portion of coker 383 by means of line 384 and are passed through cooler 385 where a partial condensation is effected. The cooled cracked gases and condensed cracked liquids are passed by means of line 386 into vapor-liquid separator 387, and the cracked liquids are removed therefrom by means of line 388 controlled by valve 389 which in turn is activated by liquid level controller 390. The cracked liquids are sent to further processing or storage facilities, not shown. The uncondensed vapors and cracked gases are removed from the upper portion of the separator 387 by means of line 391 controlled by valve 392 and are also sent to storage or further processing, not shown. If desirable these cracked gases may be combined with the hydrocarbon gas feed to oil absorber 98 or adsorption column 105 shown in Figure 1.

Within coker 383 the finely divided solid particles covered with a layer of coke settle to the bottom and are withdrawn therefrom by means of line 393 controlled by valve 394 at a temperature between about 600° F. and 1050° F. This finely divided material is introduced by means of line 395 and suspended in the heated mixture of steam and air passing by means of line 396 and the suspension is passed into synthesis gas generator 379. Air is introduced by means of line 397 into blower 398 controlled by valve 399 and is combined in proper proportions with steam introduced by means of line 400 controlled by valve 401 to form a mixture having the desired composition. For operations involving the continuous coking of heavy crude oils, a gaseous mixture containing about 37.5% by volume of steam and 62.5% by volume of air is satisfactory. This mixture is passed by means of line 402 through heater 403 and is combined with the finely divided carbon-containing solid passing through line 395.

This solid-gas suspension, introduced by means of line 396 into synthesis gas generator chamber 379, is heated to temperatures between 2000° F. and 3000° F. in synthesis gas generator 379. The partial combustion of the carbon contained on the finely divided solid material is effected to form a combustion gas containing hydrogen, nitrogen and carbon monoxide, together with the carbon-free solid material. This carbon-free solid material is withdrawn from generator 379 by means of line 389 as previously described and is employed as the heat transfer medium to raise the temperature of the incoming heavy hydrocarbon feed to the cracking temperature. The combustion gas is removed from generator 379 by means of line 404 and introduced into combustion gas cooler 405. Herein the temperature is lowered from about 2500° F. to about 200° F. to 500° F. and the heat thus dissipated may, if desired, be employed in preheating the steam-air mixture referred to below in which case cooler 405 and preheater 403 form a heat interchanger. The cooled combustion gas is passed by means of line 406 into separator 407 wherein suspended particles of solid material are separated. These separated particles are withdrawn from separator 407 by means of line 408 controlled by valve 409 and passed to synthesis gas regenerator 379 by means of line 410. The combustion gas, substantially free from suspended solid particles is removed from separator 407 by means of line 411 controlled by valve 412 and is sent to processing facilities such as those schematically shown for the fractionation of such a combustion gas such as those shown in Figure 1.

The finely divided solid material referred to previously is employed in the process just described as a heat transfer medium and the materials which fulfill the requirements of such a finely divided solid include the highly refractive difficultly reducible oxides such as alumina, silica, zirconia, thoria, and the like, having mesh sizes of between about 20 to 100 or smaller. One preferred material which may be used is pure silica sand graded to contain particles having mesh sizes of between about 20 and 100 mesh.

By the combination process of the present invention as hereinabove disclosed, it has been found possible to realize the highly efficient production, separation, and conversion of gaseous mixtures comprising hydrogen, nitrogen and carbon monoxide with the resultant formation of such commodities as synthetic liquid ammonia, synthetic methanol and higher molecular weight alcohols, synthetic liquid hydrocarbons suitable for use as internal combustion engine fuels, solvents or lubricants, as well as smaller quantities of such oxygenated organic compounds as aldehydes, ketones, acids, etc. The advantages and desirable features of the present invention are apparently attributable to the efficient separations of such gaseous mixtures obtainable through application of the described selective adsorption processes.

By combining the process of partial combustion with the selective adsorption process in conjunction with a catalytic process for the hydrogenation of carbon monoxide, advantages have been realized over the conventional processes for the preparation of synthetic organic liquids by catalytic hydrogenation of carbon monoxide wherein high purity oxygen has heretofore been an absolute requirement because of the inability of conventional separation processes to effect an efficient and/or economical separation of nitrogen, which is undesirable, from the combustion gases.

The above description of the invention is not to be taken as limiting since modifications may be made by those skilled in the art without departing from the spirit and scope of the following claims.

We claim:

1. A continuous process for the separation of gaseous mixtures containing hydrogen, nitrogen and carbon monoxide which comprises contacting said gaseous mixture at superatmospheric pressure with a moving bed of solid granular adsorbent containing a metal of the iron group of group VIII of the periodic table impregnated thereon to adsorb said nitrogen and carbon monoxide to form a rich adsorbent and leaving hydrogen substantially unadsorbed, contacting said rich adsorbent with a reflux gas containing carbon monoxide to desorb nitrogen from said rich absorbent to form a rectified adsorbent, subsequently desorbing carbon monoxide therefrom to form a lean adsorbent, removing said substantially unadsorbed hydrogen as a lean gas product, removing the desorbed nitrogen as a side cut gas product and removing the desorbed carbon monoxide as a rich gas product.

2. A process according to claim 1 wherein said solid granular adsorbent comprises activated charcoal.

3. A continuous process for the separation of a gaseous mixture containing hydrogen, nitrogen and carbon monoxide into substantially pure fractions which comprises contacting said gaseous mixture with a first downwardly moving bed of solid granular adsorbent containing from less than about 1% to about 20% of a metal of the iron group of group VIII of the periodic table impregnated thereon to adsorb nitrogen and carbon monoxide at superatmospheric pressure to form a rich adsorbent leaving hydrogen as a substantially unadsorbed gas, separating said hydrogen as a first lean gas product substantially free from nitrogen and carbon monoxide, subjecting said rich adsorbent to indirect heating to desorb said nitrogen and carbon monoxide, contacting said nitrogen and carbon monoxide with a second downwardly moving bed of said solid granular adsorbent at superatmospheric pressure thereby adsorbing carbon monoxide and part of said nitrogen to form a second rich adsorbent leaving the remaining nitrogen substantially unadsorbed, refluxing said rich adsorbent with carbon monoxide to desorb said part of said nitrogen forming a rectified adsorbent, separating said unadsorbed nitrogen as a second lean gas product substantially free from hydrogen and carbon monoxide, desorbing carbon monoxide from said rectified adsorbent by indirect heating to form a lean adsorbent and removing carbon monoxide as a rich gas product substantially free of nitrogen.

4. A process according to claim 3 wherein the moving bed of solid granular adsorbent employed to separate nitrogen and carbon monoxide comprises granules of activated charcoal impregnated with a metal of the iron group of group VIII of the periodic table.

5. A process according to claim 4 wherein the moving bed of activated charcoal used for the nitrogen-carbon monoxide separation is charcoal previously impregnated with nickel by contact with a vaporous stream of a nickel carbonyl to adsorb said nickel carbonyl and subsequently heated to a temperature sufficient to decompose said nickel carbonyl to form said activated charcoal.

6. A continuous process for the separation of a gaseous mixture containing hydrogen, nitrogen and carbon monoxide which comprises contacting said gaseous mixture at superatmospheric pressure with a first moving bed of granular activated charcoal in an adsorption zone to adsorb carbon monoxide and a small quantity of nitrogen to form a rich charcoal leaving hydrogen and the remaining portion of nitrogen as a substantially unadsorbed gas, said charcoal being impregnated with between about 1% and about 20% by weight of a metal selected from the iron group of group VIII of the periodic table, passing said rich charcoal from said adsorption zone to a rectification zone, contacting said rich charcoal therein with a reflux gas containing carbon monoxide thereby desorbing said small quantity of adsorbed nitrogen to form a rectified charcoal, passing said rectified charcoal to a desorption zone wherein said carbon monoxide is desorbed in the presence of a stripping gas to form a lean charcoal, removing the thus desorbed carbon monoxide from said desorption zone in substantially pure form, removing a mixture of hydrogen and nitrogen from said adsorption zone, contacting said mixture of hydrogen and nitrogen at superatmospheric pressure with further quantities of said granular activated charcoal as a second moving bed to adsorb nitrogen and a small quantity of hydrogen to form a second rich charcoal leaving hydrogen substantially unadsorbed, removing said hydrogen as a product gas substantially uncontaminated by nitrogen, contacting said second rich charcoal with a reflux gas comprising nitrogen thereby desorbing said small quantities of adsorbed hydrogen to form a second rectified charcoal, desorbing the adsorbed nitrogen from said second rectified charcoal in the presence of a stripping gas in a desorption zone and removing nitrogen substantially uncontaminated by hydrogen from said desorption zone.

7. A continuous process for the separation of combustion gas containing hydrogen, nitrogen and carbon monoxide and a minor proportion of more readily adsorbable constituents, contacting said combustion gas at a pressure of between about 100 and 300 pounds per square inch with between about 200 and 400 pounds of activated granular charcoal per M s. c. f. of gaseous mixture to adsorb said more readily adsorbable constituents and leaving hydrogen, nitrogen and carbon monoxide as a substantially unadsorbed lean gas, contacting said lean gas with between about 400 and 600 pounds of activated granular charcoal impregnated with between 1% and 20% by weight of a metal selected from the group consisting of iron, cobalt and nickel per M s. c. f. of said lean gas at a pressure of between about 500 and 1000 pounds per square inch to adsorb nitrogen and carbon monoxide to form a rich charcoal leaving hydrogen substantially unadsorbed, separating said substantially unadsorbed hydrogen as a second lean gas product, contacting said last named rich charcoal with a reflux gas containing carbon monoxide thereby desorbing nitrogen as a side cut gas product substantially uncontaminated by hydrogen or carbon monoxide and forming a rectified charcoal, heating said rectified charcoal to a temperature of about 650° F. to desorb carbon monoxide from said rectified charcoal, employing a portion of the carbon monoxide thus desorbed as said reflux gas and separating the remainder of said desorbed carbon monoxide as a rich gas product substantially uncontaminated by nitrogen.

8. A continuous process for the recovery of nitrogen from a gaseous mixture thereof by selective adsorption which comprises contacting said gaseous mixture at superatmospheric pressure with a moving bed of lean solid granular adsorbent impregnated with a metal selected from the iron group of group VIII of the periodic table to adsorb nitrogen and constituents more readily adsorbable than nitrogen to form a rich adsorbent leaving substantially unadsorbed constituents which are less readily adsorbable than nitrogen, contacting said rich adsorbent with a reflux gas containing constituents more readily adsorbable than nitrogen to preferentially desorb adsorbed nitrogen forming a rectified adsorbent, subsequently desorbing adsorbed constituents more readily adsorbable than nitrogen from said rectified adsorbent leaving a lean adsorbent, removing substantially unadsorbed constituents less readily adsorbable than nitrogen as a lean gas product, removing desorbed nitrogen substantially free of less readily adsorbable and more readily adsorbable constituents as a side cut gas product and removing desorbed constituents more readily adsorbable than nitrogen as a rich gas product.

9. A continuous process for the recovery of nitrogen from a gaseous mixture thereof containing carbon monoxide by selective adsorption which comprises contacting said gaseous mixture at superatmospheric pressure with a first moving bed of lean solid granular adsorbent impregnated with an amount of a metal selected from the group consisting of iron, cobalt and nickel thereby adsorbing carbon monoxide and other constituents more readily adsorbable than nitrogen and at least a portion of said nitrogen forming a first rich adsorbent and leaving the remaining nitrogen and less readily adsorbable constituents as a substantially unadsorbed gas, refluxing said rich adsorbent with a gas containing constituents more readily adsorbable than nitrogen to desorb said nitrogen forming a rectified adsorbent, subsequently desorbing adsorbed carbon monoxide and constituents more readily adsorbable than nitrogen from said rectified adsorbent to form a first rich gas product, subsequently contacting said substantially unadsorbed gas at superatmospheric pressure with a second moving bed of lean granular adsorbent thereby adsorbing nitrogen to form a second rich adsorbent and leaving less readily adsorbable constituents substantially unadsorbed as a lean gas product and desorbing substantially pure nitrogen from said second rich adsorbent as a second rich gas product.

10. A continuous process for the recovery of nitrogen from a gaseous mixture thereof containing carbon monoxide by selective adsorption which comprises contacting said gaseous mixture at superatmospheric pressure with a first moving bed of lean solid granular adsorbent impregnated with a metal selected from the group consisting of iron, cobalt and nickel to adsorb nitrogen and more readily adsorbable constituents including carbon monoxide to form a first rich adsorbent leaving constituents less readily adsorbable than nitrogen substantially unadsorbed as a first lean gas product, subsequently desorbing adsorbed nitrogen, carbon monoxide and more readily adsorbable constituents from said first rich adsorbent as a first rich gas product, subsequently contacting said first rich gas product with a second moving bed of lean solid granular adsorbent impregnated with a metal selected from the group consisting of iron, cobalt and nickel to adsorb a portion of said nitrogen and constituents more readily adsorbable than nitrogen including carbon monoxide forming a second rich adsorbent leaving the remaining portion of nitrogen unadsorbed as a substantially pure second lean gas product, refluxing said second rich adsorbent with a gas containing constituents more readily adsorbable than nitrogen to form a rectified adsorbent and subsequently desorbing said constituents more readily adsorbable than nitrogen from said rectified adsorbent as a second rich gas product.

11. A continuous process for the recovery of nitrogen from a gaseous mixture thereof with carbon monoxide by selective adsorption which comprises establishing a separation zone containing a feed gas adsorption zone, a primary rectification zone, a first side cut gas rectification zone, a second side cut gas rectification zone, a secondary rectification zone and a desorption zone at successively lower levels therein, circulating a stream of solid granular adsorbent impregnated with between about 1% and about 20% by weight of a metal of the iron group of group VIII of the periodic table to enhance carbon monoxide adsorbability through said selective adsorption zone by passing a first fraction of said adsorbent downwardly by gravity through said feed gas adsorption zone and subsequently through said primary rectification zone and a second fraction thereof successively through said first side cut gas rectification zone and said second side cut gas rectification zone, subsequently combining said first and second fractions for passage successively through said secondary rectification zone and said desorption zone, introducing said gaseous mixture into said feed gas adsorption zone adsorbing nitrogen and more readily adsorbable constituents including carbon monoxide forming a rich adsorbent leaving a lean gas product containing constituents less readily adsorbable than nitrogen substantially unadsorbed, desorbing a small portion of less readily adsorbable constituents from said rich adsorbent in said primary rectification zone forming a first partially rectified adsorbent, contacting said second fraction of adsorbent in said first side cut gas rectification zone with a reflux gas rich in nitrogen to desorb less readily adsorbable constituents therefrom, desorbing nitrogen in said second side cut gas rectification zone as a substantially pure nitrogen product by contacting the adsorbent therein with a reflux gas containing carbon monoxide as a more readily adsorbable constituent leaving a second partially rectified adsorbent, combining said first and second partially rectified adsorbents in said secondary rectification zone, contacting the partially rectified adsorbent therein with a reflux containing carbon monoxide and constituents more readily adsorbable than nitrogen thereby desorbing nitrogen and leaving a rectified adsorbent, desorbing carbon monoxide from said rich adsorbent in said desorption zone forming a rich gas product substantially free of nitrogen leaving a lean adsorbent and dividing said lean adsorbent thus formed into two fractions to contact further quantities of said gaseous mixture.

12. A continuous process for the separation of nitrogen from a gaseous mixture containing carbon monoxide which comprises contacting said gaseous mixture at superatmospheric pressure with a moving bed of solid granular adsorbent impregnated with between 1% and 20% by weight of a metal selected from the group consisting of iron, cobalt and nickel to adsorb at least a portion of said nitrogen and more readily adsorbable constituents including carbon monoxide to form a rich adsorbent impregnated to enhance carbon monoxide adsorbability with a minor but effective amount of a metal from the iron group of group VIII of the periodic table leaving constituents less readily adsorbable than nitrogen as a substantially unadsorbed lean gas, contacting said rich adsorbent with a reflux gas containing said more readily adsorbable constituents including carbon monoxide to desorb adsorbed nitrogen forming a rectified adsorbent, desorbing adsorbed carbon monoxide from said rectified adsorbent forming a rich gas and a lean adsorbent and recirculating said lean adsorbent to contact further quantities of said gaseous mixture.

13. A continuous process for the separation of gaseous mixtures containing nitrogen and carbon monoxide which comprises introducing said gaseous mixture at superatmospheric pressure into an adsorption zone, contacting said gaseous mixture therein with a moving bed of solid granular adsorbent impregnated to enhance carbon monoxide adsorbability with a minor but effective amount of a metal from the iron group of group VIII of the periodic table to form a rich adsorbent containing carbon monoxide and a portion of said nitrogen leaving the remaining nitrogen as a substantially unadsorbed gas, passing said rich adsorbent from said adsorption zone to a rectification zone, contacting said rich adsorbent therein with a reflux gas containing carbon monoxide to desorb said portion of adsorbed nitrogen forming a rectified adsorbent, passing said rectified adsorbent to a desorption zone, subjecting said rectified adsorbent therein to indirect heating and direct countercurrent contact with a stripping gas to desorb carbon monoxide therefrom leaving a lean adsorbent, removing said substantially unadsorbed nitrogen from said adsorption zone as a lean gas product, removing said desorbed carbon monoxide from said desorption zone as a rich gas product and returning said lean adsorbent from said desorption zone to said adsorption zone.

14. A continuous selective adsorption process for the separation of gaseous mixtures containing hydrogen, nitrogen and carbon monoxide which comprises establishing a separation zone comprising a cooling zone, an adsorption zone, a rectification zone and a desorption zone, passing a moving bed of solid granular charcoal downwardly by gravity successively through said aforementioned zones, said charcoal being impregnated with from about 1% to about 20% by weight of the iron group of group VIII of the periodic table to enhance the adsorption of carbon monoxide relative to nitrogen, introducing said gaseous mixture under superatmospheric pressure into said adsorption zone to pass upwardly therethrough countercurrent to said granular charcoal forming a rich adsorbent containing adsorbed carbon monoxide together with a small quantity of adsorbed nitrogen and leaving hydrogen and nitrogen as a substantially unadsorbed gas, removing said unadsorbed gas from said adsorption zone as a lean gas product substantially free from carbon monoxide, passing said rich charcoal from said adsorption zone to said rectification zone, contacting said rich charcoal therein with a reflux gas containing carbon monoxide to desorb said small quantity of adsorbed nitrogen and form a rectified charcoal containing carbon monoxide substantially free from nitrogen, passing said rectified charcoal to said desorption zone, subjecting said rectified charcoal therein to indirect heating while countercurrently contacting said charcoal with stripping steam to desorb said carbon monoxide to form a lean charcoal, passing a portion of the thus desorbed carbon monoxide to said rectification zone to serve therein as said reflux gas and removing the remaining portion from said desorption zone as a rich gas product substantially free from nitrogen, removing said hot lean charcoal from said desorption zone and returning the thus removed charcoal to said cooling zone to form a cool lean charcoal to contact further quantities of said gaseous mixture in said adsorption zone.

15. A process for the separation of a gaseous mixture containing carbon monoxide which comprises contacting said gaseous mixture with a solid granular active adsorbent containing a metal selected from the iron group of group VIII of the periodic table thereby forming a rich adsorbent containing adsorbed carbon monoxide and leaving a substantially unadsorbed gas containing less readily adsorbable constituents, contacting the rich adsorbent with a reflux gas containing carbon monoxide forming a rectified adsorbent substantially free from lean gas constituents, indirectly heating said rectified adsorbent while countercurrently contacting the heated adsorbent with a stripping gas thereby forming a hot lean adsorbent and a desorbed rich gas product containing carbon monoxide, employing part of said rich gas as said reflux gas, removing the remaining portion as a rich gas product, cooling said lean adsorbent and recirculating the cool adsorbent to contact further quantities of said gaseous mixture.

16. A process for the separation of a gaseous mixture containing nitrogen and carbon monoxide which comprises contacting said gaseous mixture with a moving bed of solid granular adsorbent impregnated with between about 1% and 20% by weight of a metal selected from the group consisting of iron, cobalt and nickel thereby forming a rich adsorbent containing adsorbed carbon monoxide and leaving the nitrogen substantially unadsorbed, indirectly heating said rich adsorbent while countercurrently contacting the heated adsorbent with a stripping gas to desorb carbon monoxide as a rich gas product leaving a hot lean adsorbent, cooling said hot adsorbent and recirculating the same to contact further quantities of said gaseous mixture.

17. A process according to claim 16 wherein said gaseous mixture comprises a combustion gas containing hydrogen, nitrogen and carbon monoxide.

18. In a process for the separation of a gaseous mixture containing carbon monoxide which comprises contacting said gaseous mixture with a solid granular adsorbent thereby adsorbing carbon monoxide and more readily adsorbable constituents forming a rich adsorbent and leaving less readily adsorbable constituents substantially unadsorbed as a lean gas product, subsequently desorbing adsorbed carbon monoxide from said rich adsorbent as a rich gas product, the improvement which comprises the step of employing a solid granular adsorbent impregnated with between about 1% and about 20% by weight of a metal selected from the iron group of group VIII of the periodic table to enhance the adsorbability of carbon monoxide on the adsorbent.

19. In a process for the separation of gaseous mixtures containing nitrogen and carbon monoxide which comprises contacting said gaseous mixture with a solid granular adsorbent thereby adsorbing carbon monoxide and more readily adsorbable constituents forming a rich adsorbent and leaving nitrogen and less readily adsorbable constituents substantially unadsorbed as a lean gas product, subsequently desorbing adsorbed carbon monoxide from said rich adsorbent as a rich gas product, the improvement which comprises the preliminary step of impregnating between about 1% and about 20% by weight of an iron group metal on the adsorbent to increase the selectivity thereof for carbon monoxide in preference to nitrogen.

20. A process according to claim 19 wherein the adsorbent is impregnated with said metal by preliminarily contacting the adsorbent with a vaporous stream of a carbonyl of said metal and subsequently heating the thus impregnated adsorbent to a temperature sufficient to decompose said metal carbonyl leaving a metal impregnated adsorbent.

CLYDE H. O. BERG.
HOMER C. REED.
FRED L. HARTLEY.

REFERENCES CITED

The following references are of record in the file of this patent:

UNITED STATES PATENTS

| Number | Name | Date |
| --- | --- | --- |
| 1,251,203 | Ellis | Dec. 25, 1917 |
| 1,299,641 | Weintraub | Apr. 8, 1919 |
| 1,422,007 | Soddy | July 4, 1922 |
| 1,519,470 | Wilson | Dec. 16, 1924 |
| 1,616,242 | Voress et al. | Feb. 1, 1927 |
| 1,617,960 | Muller | Feb. 15, 1927 |
| 1,899,184 | De Simo | Feb. 28, 1933 |
| 1,935,469 | Ellis | Nov. 14, 1933 |
| 1,939,647 | Arnold et al. | Dec. 19, 1933 |
| 2,217,429 | Balcar | Oct. 8, 1940 |
| 2,254,799 | Erdmann | Sept. 2, 1941 |
| 2,324,079 | Greger | July 13, 1943 |
| 2,325,577 | Balcar | July 27, 1943 |
| 2,376,425 | Frey | May 22, 1945 |
| 2,384,311 | Kearby | Sept. 4, 1945 |
| 2,407,813 | Cheney | Sept. 17, 1946 |
| 2,425,754 | Murphee | Aug. 19, 1947 |

OTHER REFERENCES

Garner: "Charcoal as an adsorbent," Natural Gas, vol. V, No. 11, November 1924, pages 3 and 4.